(12) United States Patent
Phillips et al.

(10) Patent No.: US 12,529,892 B2
(45) Date of Patent: Jan. 20, 2026

(54) SYSTEMS AND METHODS FOR IMPROVED QUALITY OF EXPERIENCE IN AUGMENTED REALITY DISPLAYS USING LIGHT INTENSITY MEASUREMENTS

(71) Applicant: Adeia Guides Inc., San Jose, CA (US)

(72) Inventors: Christopher Phillips, Hartwell, GA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 626 days.

(21) Appl. No.: 17/943,091

(22) Filed: Sep. 12, 2022

(65) Prior Publication Data

US 2024/0085695 A1 Mar. 14, 2024

(51) Int. Cl.
*G02B 27/01* (2006.01)
*G06T 19/00* (2011.01)

(52) U.S. Cl.
CPC ........ *G02B 27/0101* (2013.01); *G06T 19/006* (2013.01)

(58) Field of Classification Search
CPC .. G02B 27/01; G02B 27/017; G02B 27/0101; G02B 27/0172; G02B 27/0178; G06T 2219/2004; G06T 2219/2021; G06T 19/00; G06T 19/006; G06T 19/20
See application file for complete search history.

(56) References Cited

U.S. PATENT DOCUMENTS

| | | | |
|---|---|---|---|
| 10,885,701 B1* | 1/2021 | Patel | A63F 13/57 |
| 2014/0132629 A1 | 5/2014 | Pandey et al. | |
| 2016/0350967 A1 | 12/2016 | Klassen | |
| 2017/0256096 A1* | 9/2017 | Faaborg | G06T 19/003 |
| 2018/0190019 A1* | 7/2018 | Glynn | H04L 67/131 |
| 2021/0026142 A1 | 1/2021 | Gotoh | |
| 2021/0241676 A1* | 8/2021 | Hazra | G09G 5/10 |
| 2021/0256739 A1* | 8/2021 | Franklin | G06Q 30/0241 |

OTHER PUBLICATIONS

U.S. Appl. No. 17/943,087, filed Sep. 12, 2022, Christopher Phillips.

* cited by examiner

*Primary Examiner* — Sultan Chowdhury
(74) *Attorney, Agent, or Firm* — HALEY GUILIANO LLP

(57) ABSTRACT

An AR display compensates for excessive light levels in a location in which the AR display is being used. AR objects are rendered for display on the AR display. Light levels in a location at which an AR object is being rendered for display are monitored. If the light level in the location exceeds the threshold light level, a light source in the location is identified and light emissions from the identified light source are mitigated.

20 Claims, 15 Drawing Sheets

SYSTEMS AND METHODS FOR IMPROVED QUALITY OF EXPERIENCE IN AUGMENTED REALITY DISPLAYS USING LIGHT INTENSITY MEASUREMENTS

BACKGROUND

This disclosure directed to displaying virtual objects on an augmented reality display. In particular, techniques are disclosed for improving quality of experience for head mounted augmented reality displays in well-lit areas.

SUMMARY

See-through augmented reality (AR) head mounted displays (HMDs) suffer from the efficiency of light carried through the waveguide. As light travels through the waveguide there is an amount of loss that occurs. This causes a brightness problem even with the latest high-end AR see through HMDs. When using an AR HMD in an area with a high amount of light, depending on the intensity of the light, it can be difficult or impossible to see the AR virtual objects especially when they are statically positioned or dynamically move in front of a high intensity light source. This results in an extremely poor quality of experience (QoE) for the user. An example is when a user places virtual objects in front of a window at a time of day when no sunlight is shining directly through the window. When the user returns at a time of day when direct sunlight is shining through the window, depending on the intensity of the light and the brightness of the display, the virtual objects cannot be seen due to this backlight. Another example is when virtual objects are placed in areas in front of room lighting. During the day, when the lights are off, the user can clearly see the virtual objects. At night when the lights are turned on, depending on the intensity of the light, the visual quality of the virtual objects will be poor or cannot even be seen by the user. This is a known major limitation of see-through AR HMDs.

To minimize the amount of loss with the current AR HMD see-through display technology, the field of vision (FoV) remains very narrow to enable the brightness of the display to be bright enough for a user to see virtual objects in a lighted room. The FoV of these displays is very narrow compared to VR HMDs. Both Microsoft and Magic Leap are the leading manufacturers of standalone AR HMDs. These AR HMDs are also considered the higher end of AR see through HMDs. However, even with the very narrow FoV of the AR see-through displays, the QoE remains poor as light intensity increases.

The present invention measures light levels while spatially mapping a room at different locations in the room. The spatial coordinates of light level zones will be incorporated into the spatial map. The light level range data will be saved with the spatial map data. The light levels can change throughout the day based on incoming sunlight. Statically placed AR/VR elements in the spatially mapped area will be automatically relocated into other lower light areas in the spatially mapped area. Dynamically moving VR objects will be prevented from entering zones above a certain light intensity level. Smart devices like smart light bulbs, smart window blinds, curtains, and electronically controlled dimming windows will also be controlled based on calculated light levels.

While spatially mapping a room, light intensity levels will also be measured. Spatial coordinates in the areas of light based on intensity will be saved along with the spatial map data. These can also be updated to reflect different times of the day when the device is used. These can also be recorded when the device initially starts, and the light levels are saved for the session or can be dynamically measured as an application is being used.

More specifically, a dedicated service periodically/automatically measures light conditions in the environment (e.g., this can be triggered by the user picking up their AR device) and make that information available to any app that subscribes to such information. The light measuring process can take place on-device or on a server in which case the individual apps can query such data upon launch. Apps can indicate their preference to access such data via their manifests. For example, as light condition changes are detected and the new measurements exceed a threshold, the "light profile" of the environment is automatically updated. In order to conserve battery life, the periodicity of measurements can be based on anticipated use (e.g., based on past use behavior), and during use. Regardless of where the measurements occur, such metadata is available to update an existing spatial map. Therefore, various apps can rely on such data to perform all sort of actions, including designating areas where 3D objects or graphics should be or should not be rendered/overlaid.

Users are expected to roam around an environment when wearing the see-through AR glasses. For example, a user might move from their living room to their kitchen. Therefore, to reduce the amount of light, the existing invention relies on the "home automation" embodiments below to auto-control accessories with a high light output. Built in cameras can be used to determine the amount of light (measured in lux) to +/−5% accuracy. The following formula can be used for the purpose of measuring light using one or more of the front-facing cameras on an AR HMD device:

$$\text{Lux} = 50 \times \text{aperture}^2 / (\text{exposure\_time} \times \text{ISO}) \qquad \text{Equation 1}$$

Device API calls can be used to obtain values for the aperture, exposure time (i.e., shutter speed), and ISO setting (referring to the camera's sensitivity to light) for one or more of the AR HMD front-facing cameras. This approach has been tested to be within 5% accuracy of measurements made with a light intensity sensor. While the Microsoft HoloLens 1 and 2 as well as the Magic Leap 1 do not currently include a light intensity sensor, these sensors are extremely cheap and are included in almost all smart phones today, as well as many TVs. Future AR see-through displays will likely incorporate these sensors. Alternatively, the AR headset can rely on the user's phone to collect information about the lighting conditions in the environment or even use such measurements to augment its own calculations. The phone and AR glasses can pair during the scanning process.

In one embodiment, when building the spatial map, light detection in the room in lux or foot-candle is measured and recorded as the spatial map is built. This invention uses lux as calculated in the previous formula however if foot-candle is used, the conversion of lux to foot-candle is lux/10.76. Spatial coordinates of areas are recorded based on light intensity ranges. Any light below a range value threshold will not be saved. These light ranges will be used to limit placement or movement of virtual objects into zones that exceed the light range for the zone. In the automatic placement, the device will consider the user's position in the spatially mapped room. Just like spatial maps are updated based on changes in a room, the light ranges will be updated as the user continues to use the device. Based on the level of sunlight entering the room at different times of the day, the light intensity levels will be continuously loaded based on the changing times of the day to keep the spatial map up to date with the changing light conditions. Depending on the device or application, these light measurements can continue to be made while the device is being used or applications which require continuous light monitoring are running to account for dynamically changing light conditions.

In one embodiment, the user of the AR device can provide feedback during the scanning process. For example, during the scanning process a user might confirm whether the blinds are open or closed and the light intensity can be recorded for both states. Additionally, the scanning process can determine such information from a home automation system or a service, such as Apple's Home, to determine an existing state for the accessories and automatically retrieve information about such accessories, including vendor, model, etc. Cleary, only accessories that are capable of outputting light (e.g., smart bulbs, TVs) or let light into the room (e.g., curtains) are prioritized. Adding and/or removing smart accessories that emit light to any environment can result in updating the spatial map to reflect the lighting conditions when the new accessory is on/off. The states of the accessories can be changed during the scanning process to record the light intensity while the accessory is in 2 different states (e.g., open vs closed, or ON vs OFF).

In one embodiment, a change to a state of an accessory could trigger the light measurement service to automatically initiate an update process to update the spatial map that corresponds to the location of the smart accessory. Since the smart accessories are assigned to locations (e.g., living room, kitchen, bedroom), the location of AR glass (i.e., within which spatial environment) can be used to determine the light source is in the same vicinity. Similarly, the benefit of an AR display device having control of certain accessories during an AR session enables setting an optimal lighting condition so that synthetic content looks realistic to the user. For example, the light measuring service can issue commands to smart accessories to change their light intensity if that necessary to rendering of an optimal scene. The commands can include dimming a light source or controlling the blinds.

In one embodiment, the user can give feedback during an AR session or after the completion of an AR session, and the lighting conditions/smart accessory states are saved to replicate in a subsequent AR session in the same environment (using the same spatial map) as a current session. Feedback can include detections of gesture such as thumbs up/down, a response to a voice query from the AR system, rating the experience as x-stars (where x is, for example, a number between 1 and 5), etc.

The AR device generates a spatial map of a room in which it is being used. The AR device can incorporate measured light intensity ranges from each light source with the spatial coordinates of each light source. The AR device continuously or periodically scans the environment and creates or updates the spatial map based on any missing data for an area. It also updates a spatial map based on objects being added, moved, or removed from a spatial map area. The measurement of light intensity around the spatially mapped room is also added to the map and updated based on the continuous or periodic scans. Any the spatial coordinates for any light intensity that exceeds a threshold value as determined by a threshold value on the AR HMD device or as determined by an application will be saved to the device. AR devices like the HoloLens 1 and 2 and the magic leap build and dynamically update a default spatial map when using the device without running any specific applications. Some applications require a denser spatial map than the default spatial map. In this case, when running the application, a custom density spatial map will be created based on the application's requirements. As with building custom spatial maps specific to the application, light intensity maps may need to be custom or specific as defined by the application.

In an embodiment, zones can be relocated based on light entering the room. Virtual screens placed in the afternoon can be affected by the amount of backlight from the sun entering through a window in the morning. The same goes for AR virtual objects placed in the afternoon can be affected by the morning sun. The AR device will query the saved light intensity zones for the current time of day and will automatically determine an optimal replacement of the static virtual objects to a new location in the room for the optimal viewing QoE based on the user's location within the room and the light intensity at areas in the room. Leveraging the light intensity values, a Virtual Object No Entry Zone (or No Object Placement Zone) is defined to prevent any dynamically moving virtual object to enter the Virtual Object No Entry Zone. This will prevent the dynamically moving virtual objects to enter a high light intensity area where the virtual objects will not be seen at all by the user, or the virtual object will appear extremely dim due to the amount of light entering the AR display. Additionally, the light intensity can be updated dynamically while using the device or within an application. As an example, sunlight may come through a window when starting the application or using the device. While continuing to use the device, cloud cover may reduce the light intensity below the level threshold allowing virtual objects to be placed within the area.

In some cases, the amount of light entering through a window does not exceed the device capabilities of the display or an application developer's requirements of light level which will result in a poor QoE for the user. A static zone defined for virtual AR televisions or other AR objects is placed in front of the window. Originally placed static AR virtual objects in front of the window remain in front of the window when the light intensity is below the threshold value for the device or the threshold value for the application. Dynamically moving virtual objects are allowed to move in front or on the window since the light intensity is below the threshold value for the device or application. If the amount of light entering through the window later exceeds the device capabilities of the display or the application developer's requirements of light levels, the static zone defined for virtual AR televisions or other AR objects is relocated. A Virtual Object No Entry Zone may also be defined around the window. Dynamically moving virtual objects will not be allowed to enter the spatial coordinates defining the Virtual Object No Entry Zone.

In some embodiments, light sources are identified in the spatially mapped room. A list of smart devices is presented to the user that are identified to control lighting in the spatially mapped room. A list of smart devices which are filtered to control lighting will be presented beside each light source. These devices can be added like Alexa or Google home through the smart device's plugin. Once the devices are added, a calibration step will take place. For smart light bulb(s) or groupings of bulbs. The light brightness level will be brought to the brightest level and dimmed to the dimmest level measuring and saving the light intensity at each level. For smart blinds and curtain controllers, when the sunlight is entering the room, the blinds or curtains will be operated from fully opened to fully closed measuring the light intensity entering the room. As the curtains or blinds are operated from fully open to fully closed, the incoming light intensity will be measured and saved for each smart blind or smart curtain controller at each level. For smart glass, the opacity will be set to the minimum setting and the glass opaque level will be increased in setting steps and the amount of incoming light will be measured and saved at each setting increment. Once the calibration is complete, the proper setting level for the smart glass or window covering will be controlled based on there the spatial coordinates fall within the intensity level for a good QoE for the user. For statically placed objects, the level will slowly change as the entering sunlight changes. For dynamically moving virtual objects, the settings can change much faster depending on where the moving virtual object is within the light intensity spatial coordinate range. Smart display devices like TVs and monitors can also be recognized as light sources where the brightness of the TV can be controlled. A list of smart display devices will be displayed as a list to allow association of the display device within the spatially mapped area. Smart devices can be filtered based on object detection and differentiation of the smart device control. For example, lights are recognized and filtered based on light devices, curtain, blinds, and smart window glass are recognized based on identified window locations and display devices like TVs, monitors and video assistants are filtered based on display device recognition.

In another embodiment, smart light bulbs will be controlled based on the location of virtual objects and the user's position within a spatially mapped room. For statically placed objects, when the lights are on and the static virtual object falls within the user's viewport or a dynamically moving object moves into an area that would be high intensity light and the light intensity exceeds the threshold value of the device or the application developer's definition of a light intensity level for the application, the AR device will dim the light(s) to an acceptable intensity level for a good QoE. The varying intensity levels for the lights can be measured and saved when the device is creating the spatial map of the room. It can also be a dynamic measurement in real time while the user is using the device or running an application.

Smart light bulbs may be associated with the spatial coordinates of areas where there is a light source, and the intensity is higher than the threshold value of the device or a user defined application. Depending on the spatial coordinates of the static AR virtual object(s), the light level is controlled based on the brightness level of the light or grouped lights. When dynamically moving virtual objects enters areas above the threshold light intensity level, the smart light bulb or bulb groups lighting level will be reduced to a level below the threshold value of the device or application defined threshold value.

In some embodiments, smart blinds or curtains will be controlled based on the location of virtual objects and the user's position within a spatially mapped room. For statically placed objects, when the lights are on and the static virtual object falls within the user's viewport or a dynamically moving object moves into an area that would be high intensity light and the light intensity exceeds the threshold value of the device or the application developer's definition of a light intensity level for the application, the AR device will dim the light(s) to an acceptable intensity level for a good QoE. The varying intensity levels for the lights can be measured and saved when the device is creating the spatial map of the room. It can also be a dynamic measurement in real time while the user is using the device or running an application. In an example, smart glass, blinds or curtain control have been associated with the spatial coordinates of areas (windows) where there is a light source, and the intensity is higher than the threshold value of the device or a user defined application. If the device is smart glass, the smart glass' opacity level will be increased to reduce the amount of incoming light to be within the threshold of the device or application defined light intensity level. If the device is a smart window blind, the blind will be closed to reduce the amount of light to a level within the threshold of the device or the application defined threshold. If the device is a window curtain controller, the curtain will be closed to a point where the light intensity will be below the device threshold value, or the application defined threshold value. If it is a dynamically moving virtual object, the smart glass, blinds, or curtains will be dynamically controlled.

There are cases where it is desirable to overlay supplemental information over physical display devices. There can also be cases when it is desirable to allow the entire display to be overlaid with a virtual image or video replacing the original video or image displayed on the physical device. There are other cases where only a portion of the video or image on a physical display will need to be overlaid, blacked out or blurred from the view. If the light emitted from the physical device is too bright, the original image or video will be seen through the AR overlay. There can also be dynamically moving AR virtual objects related to what is being viewed on the physical display/television. These objects may move within the view of the physical display device. When this occurs, the light intensity of the physical display may need to be reduced for an optimal QoE for the AR virtual object. To optimize the QoE, the brightness and/or contrast of the physical display can be optimized based on the limitations of the AR HMD device or the application running on the AR HMD. Based on the measured light intensity level of the smart physical display, the AR HMD will lower the brightness of the physical display to fall within the threshold value of the AR HMD or application on the AR HMD. This can also be dynamically adaptable based on the brightness of the content being displayed on the physical device.

In an example, brightness/contrast is controlled on a smart physical display device based on dynamically moving supplemental content. In this case, there is a dynamically moving AR virtual object related to the content being watched on a physical TV/display. Depending on whether the AR virtual object is in view of the physical display device, the display device's brightness will be reduced to a level threshold level for the dynamically moving supplemental to be viewed with a good QoE when it moved in front of the physical display device.

In cases that demonstrate AR Virtual video, image, bounding boxes, or blurring overlays over a physical display device, any of the above embodiments may apply. In each of these use cases, the brightness of the physical TV/display will be required to be at a light intensity level where the original display cannot be viewed through the AR virtual display. In all these cases, the brightness can be controlled dynamically based on changing brightness of the scene or can be statically set based on the light level intensity of the display for the duration of the AR session.

In some embodiments, the light intensities from the smart devices for any statically placed virtual objects for the device and any memory resident applications may be initially set. This will set all smart devices to the proper light levels on device startup. The location of static virtual objects, including any newly added static virtual objects, and the location and movement of dynamic virtual objects is monitored. If a static virtual object is added, lighting can be controlled at the location at which the object is displayed. If a dynamically moving virtual object moves into the spatial coordinate zone of a light source and the intensity of the light source is greater than the device threshold or the application defined threshold, the smart device will lower the lighting level to within the defined threshold value.

Systems and methods are described herein for modifying display of an object in an AR display. Positions of AR objects being rendered for display on the AR display are identified. For example, a set of coordinates describing the position of each AR object may be retrieved. A light level in an area in which an AR object is positioned is then detected and compared to a threshold light level. If the detected light level exceeds the threshold light level, display of the AR object is modified. In one embodiment, the position of the AR object is adjusted to a second position at which the light level is at or below the threshold light level. The AR object is then re-rendered for display on the AR display at the second position.

To adjust the position of the AR object to a second position at which the light level is at or below the threshold light level, a plurality of areas having light levels at or below the threshold light level are identified. For example, the AR display may monitor light levels at multiple positions surrounding the AR display. It is determined whether any AR objects are currently located in each area. If there are no AR objects currently located in a first area, the position of the AR object is adjusted to position the AR object in the first area. This may be accomplished by determining a range of coordinates, relative to a reference position, that comprise the first area. Coordinates of the AR object can then be modified to be within the range of coordinates. In some embodiments, only the area within a current field of view of the AR display are considered for repositioning of the AR object. However, in other embodiments, an entire 360-degree field around the AR display is considered. If an area that is outside the current field of view is determined as the position at which the AR object is to be relocated, the AR display may generate for display a navigational indicator to where the AR object was moved so that the user can find it.

If another AR object is currently located in the area to which the AR object is to be relocated, it is determined whether the AR object can be placed in the area without obstructing the existing AR object. If not, a position of the existing AR object is adjusted, within the area, to accommodate placement of the AR object. For example, a first AR object may be placed in the center of an area with insufficient space between it and a boundary of the area to fit another AR object. The first AR object may be moved closer to the boundary of the are to make sufficient space for another AR object to be placed within the are without overlapping any portion of the first AR object. Alternatively or additionally, one or more AR objects may be resized in one or more dimensions to make sufficient space.

In some embodiments, an initial light level detecting in an area is stored. The light level in that area is may then be periodically measured. If, after comparing the measured light level to the stored light level, it is determined that the light level in the area has increased by a threshold amount, display of an AR object in the area may be modified. For example, a transparency level of the AR object may be determined. If the AR object is being displayed in a transparent manner, the opacity of the AR object may be increased. In another example, an area around the AR object may be darkened to provide additional contrast and block some light from the area from reaching the user's eyes. As another example, a contrast level of the AR object itself may be increased.

Some AR objects may be dynamic AR objects that move about the AR display according to preset or chaotic paths. If the light level in an area is above the threshold light level, dynamic objects may be prevented from entering the area. This may be accomplished by altering a trajectory of the dynamic AR object to avoid the area.

The AR display may create a spatial map of the location in which it is being used so that real-world objects can be accounted for in the AR display. While creating a spatial map of the area, the AR display measures respective light levels at a plurality of positions within the area. The light levels are periodically remeasured, and the spatial map updated with the current light levels at each position.

Also described herein are system and methods for compensating for excessive light levels when using an AR display. AR objects are rendered for display on the AR display. Light levels in a location at which an AR object is being rendered for display are monitored. If the light level in the location exceeds the threshold light level, a light source in the location is identified and light emissions from the identified light source are mitigated.

To identify a light source, light levels are measured in a plurality of positions within a location. The light level measured at each position is compared with the threshold light level. If the light level measured at a first position exceeds the threshold light level, that position is identified as the light source in that location. More than one light source may be at the location, such as a cluster of light bulbs, an overhead light and a floor lamp, or a window and a light. Each one may be identified separately as a light source using this method. Alternatively, instead of comparing the light level at each position to the threshold light level, the light level at each position may be compared with light levels at each other position to determine the positions having the brightest light level, even if the level does not exceed the threshold light level. In some embodiments, indications of light sources may be stored in association with identifiers of positions at which they are located. These may be stored in separate light source list, database, or other data structure, or may be stored in a spatial map of the area.

A type of each light source may be identified. For example, a light source may be identified as a recessed ceiling light if it is positioned on the ceiling, while a light source positioned on a wall may be identified as a window. Light sources positioned away from surfaces may be identified as lamps. If the light source is identified as light fixture (including recessed or overhead lighting and table lamps and floor lamps), mitigation of light emissions from the light source may be accomplished by accessing an Internet of Things (IoT) controller for the light source and instructing the controller to decrease the light output of the fixture. If the light source is identified as a window, mitigation of light emissions from the light source may be accomplished by accessing an IoT controller for shades, curtains, or smart glass that can be selectively darkened to reduce light transmission through the glass, and instructing the control to perform an appropriate action (close shades or curtains, darken glass, etc.) to reduce the brightness of the light source.

It may sometimes be necessary to mitigate light emissions from more than one light source. For example, the average light level in the area that includes the location may be measured. After mitigating light emissions from a first light source, it is determined whether the light level in the location is at or below the threshold light level. If the light level still exceeds the threshold light level, the average light level in the area is compared with a second threshold light level. If the average light level in the area exceeds the second threshold light level, light emissions from a second light source are mitigated. For example, a plurality of light sources within the area are identified and respective light levels of each light source determined. The brightest of the plurality of light sources is then selected and its light output mitigated.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
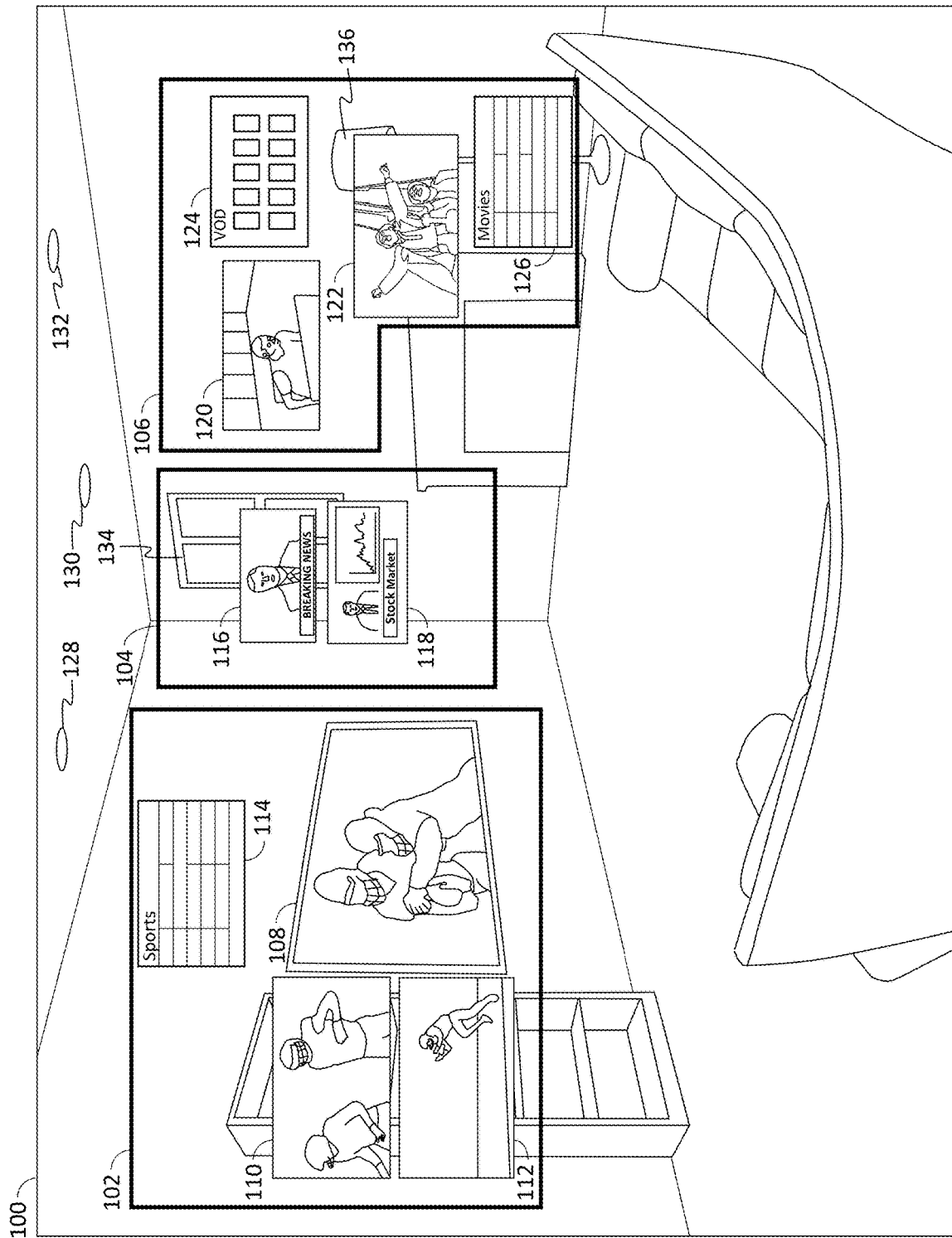
FIG. 1 shows an illustrative example of an AR display being used in an area where light sources are present, in accordance with some embodiments of the disclosure.

FIG. 1 shows an illustrative example of an AR display being used in an area where light sources are present, in accordance with some embodiments of the disclosure. The AR display device may map a location, such as a room in a house, to identify a number of zones in the location. The room may be mapped using imaging sensors, such as cameras, infrared sensors, light ranging sensors, and any other suitable sensors to full map a three-dimensional space surround the AR display device. Zones within the location may be identified as areas within the mapped space that may be obstructed from the view of the user without endangering the user's ability to move around the location. For example, a piece of furniture in the middle of a room, such as a table, may not be suitable for obstruction, as the user may accidentally walk into the table. However, a bookshelf against a wall would be suitable for obstruction, as the user is not likely to walk into it. Doorways may also not be suitable for obstruction, as the user may need to be able to see what is happening in another room and may need to know where the exits to the room are in case of emergency.

During setup of an AR display configuration, zones may be identified in a 360-degree field around the AR display device, with only a subset of identified zones visible in field of view of the AR display device at any one time. Field of view 100 includes three identified zones 102, 104, and 106. Each zone may be associated with a different category of content items. For example, zone 102 may be associated with sports, zone 104 with news, and zone 106 with entertainment content. These association may be manually input by the user or may be determined based on content consumption history of the user. Zone 102 may include a physical display device 108, such as a 4K TV, which the AR display device may be able to control for additional content output. Thus, sports content items 108, 110, and 112 may be displayed in zone 102 along with sports EPG data 114. News content items 116 and 118 may similarly be displayed in zone 104, and entertainment content items (e.g., movies and TV shows) may be displayed in zone 106 along with a VOD menu 124 and EPG data 126.

The area shown in FIG. 1 also includes several light sources, including overhead lights 128, 130, and 132, window 134, and floor lamp 136. Each of these light sources may be controllable using an IoT controller. For example, overhead lights 128, 130, and 132 may be individual smart lightbulbs or may be on a lighting circuit controlled by a smart light switch. Similarly, floor lamp 136 may contain a smart lightbulb or may be plugged into a smart outlet or an outlet controlled by a smart switch. Window 134 may comprise smart glass that can be selectively darkened or may have smart window shades installed over it which can be raised and lowered using an IoT controller.

Figure 2:
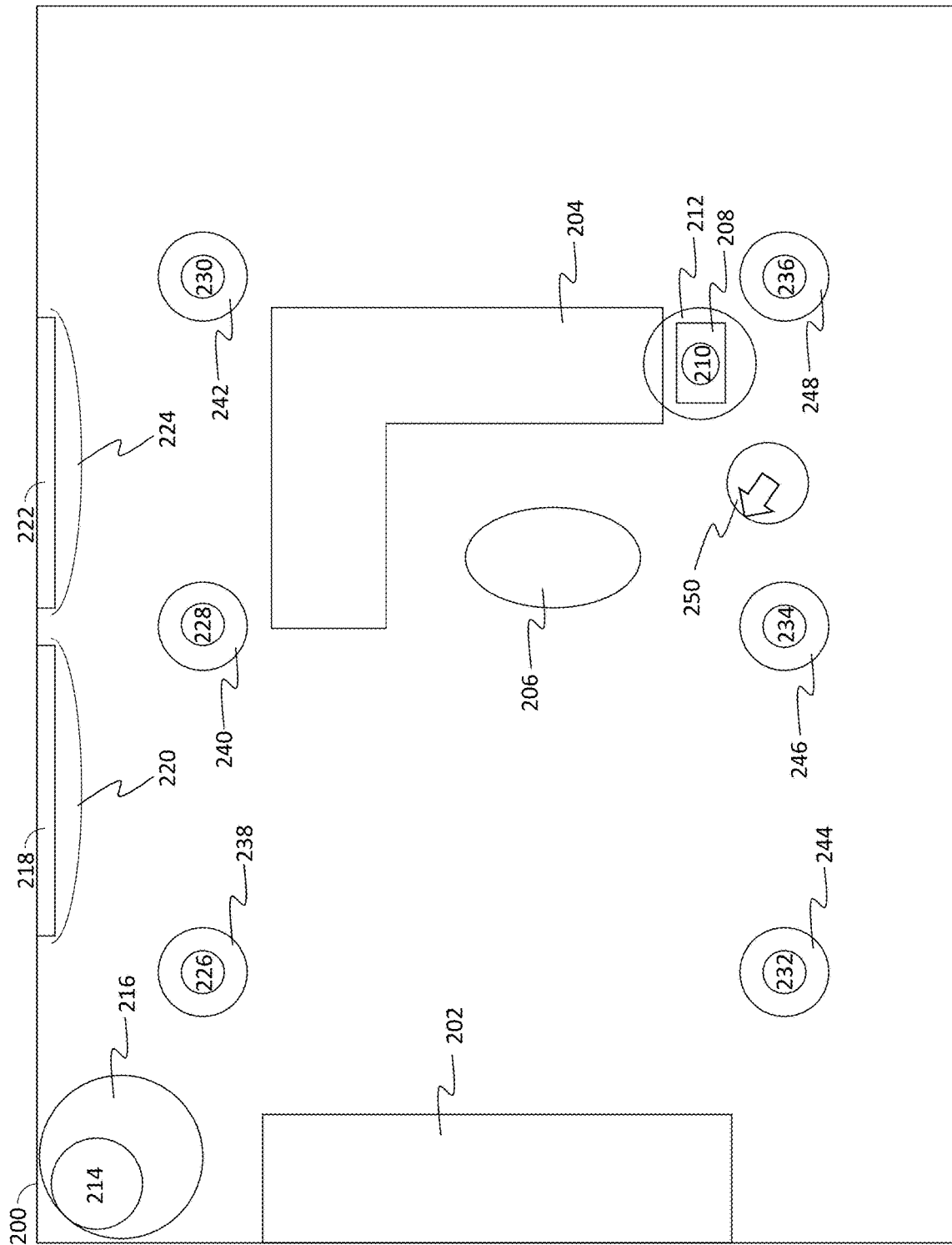
FIG. 2 shows an illustrative example of a location in which an AR device is being used and respective high intensity light areas surrounding each light source, in accordance with some embodiments of the disclosure.

FIG. 2 shows an illustrative example of a location in which an AR device is being used and respective high intensity light areas surrounding each light source, in accordance with some embodiments of the disclosure. Location 200 includes a TV display 202, a couch 204, coffee table 206, and side table 208. A lamp 210 may be placed on side table 208. When lamp 210 is on, it may have a high intensity light area 212 surrounding it. Similarly, a floor lamp 214, when on, may have a high intensity light area 216 surrounding it. Window 218 has a light zone 220 with variable intensity depending on the time of day. Window 222 similarly has a variable intensity light zone 224. Overhead lights 226, 228, 2430, 232, 234, and 236 have high intensity light zones 238, 240, 242, 244, 246, and 248, respectively. Any one or more of these light sources may be in the field of view of AR device 250 and light emissions from any one or more of them may need to be mitigated to improve quality of experience for the user.

Figure 3:
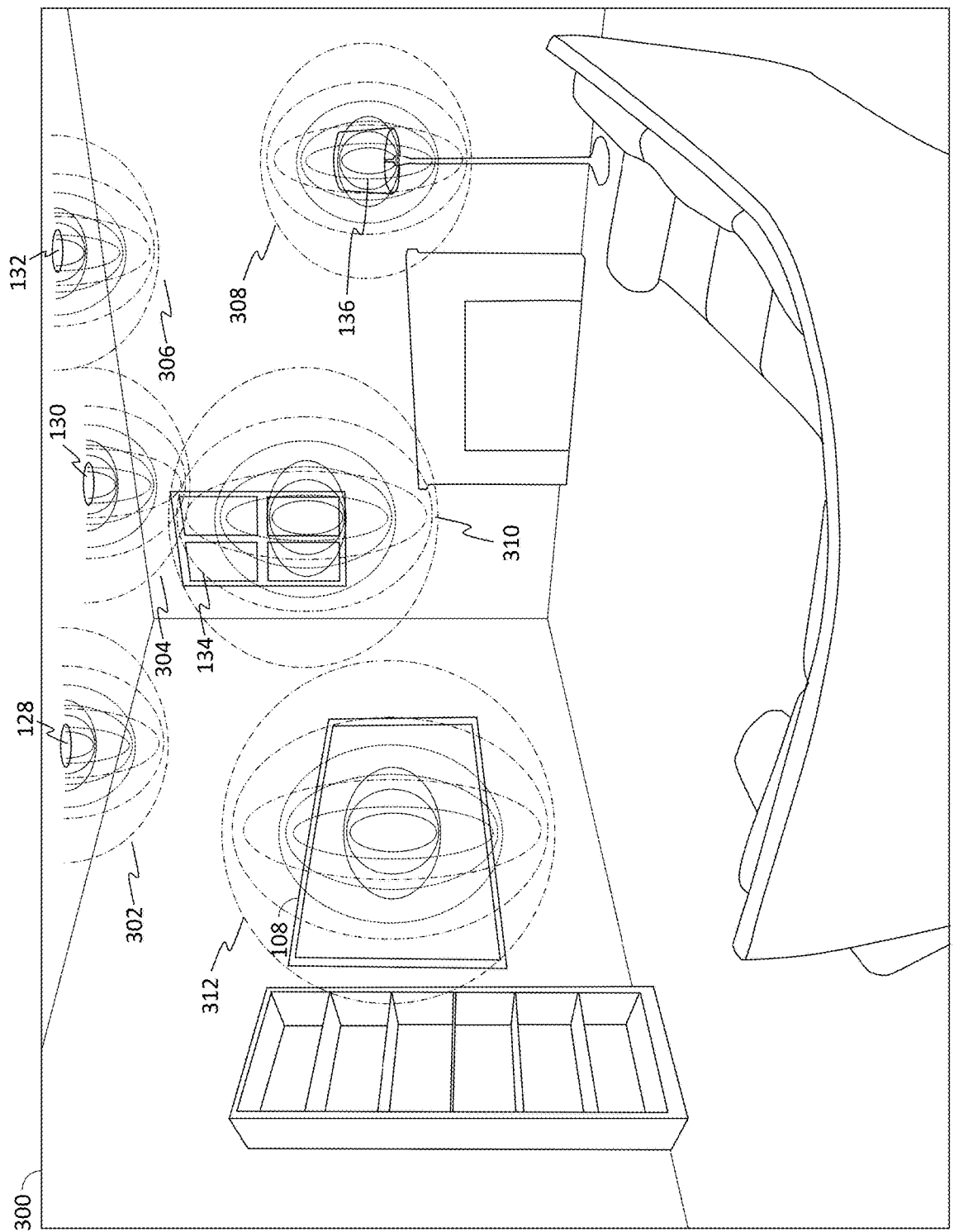
FIG. 3 shows an illustrative example of light intensity mapping, in accordance with some embodiments of the disclosure.

FIG. 3 shows an illustrative example of light intensity mapping, in accordance with some embodiments of the disclosure. Field of view 300 may be represented by a spatial map of the area, including location and dimensions of each object in the area. An AR device may use a light sensor or a camera to measure light output at various points in the area. Areas of sufficiently high light intensity are then mapped. Thus, while light emitted from overhead light 128 may reach all around the area, the area surrounding overhead light 128 is of sufficiently high intensity and is mapped as light intensity zone 302. Overhead lights 130 and 132 have similar zones 304 and 306, as do floor lamp 136 (zone 308), window 134 (zone 310) and TV 108 (zone 312). Coordinates for these zones, as well as the light intensity measurements for each zone, are stored in the spatial map of the area.

Figure 4:
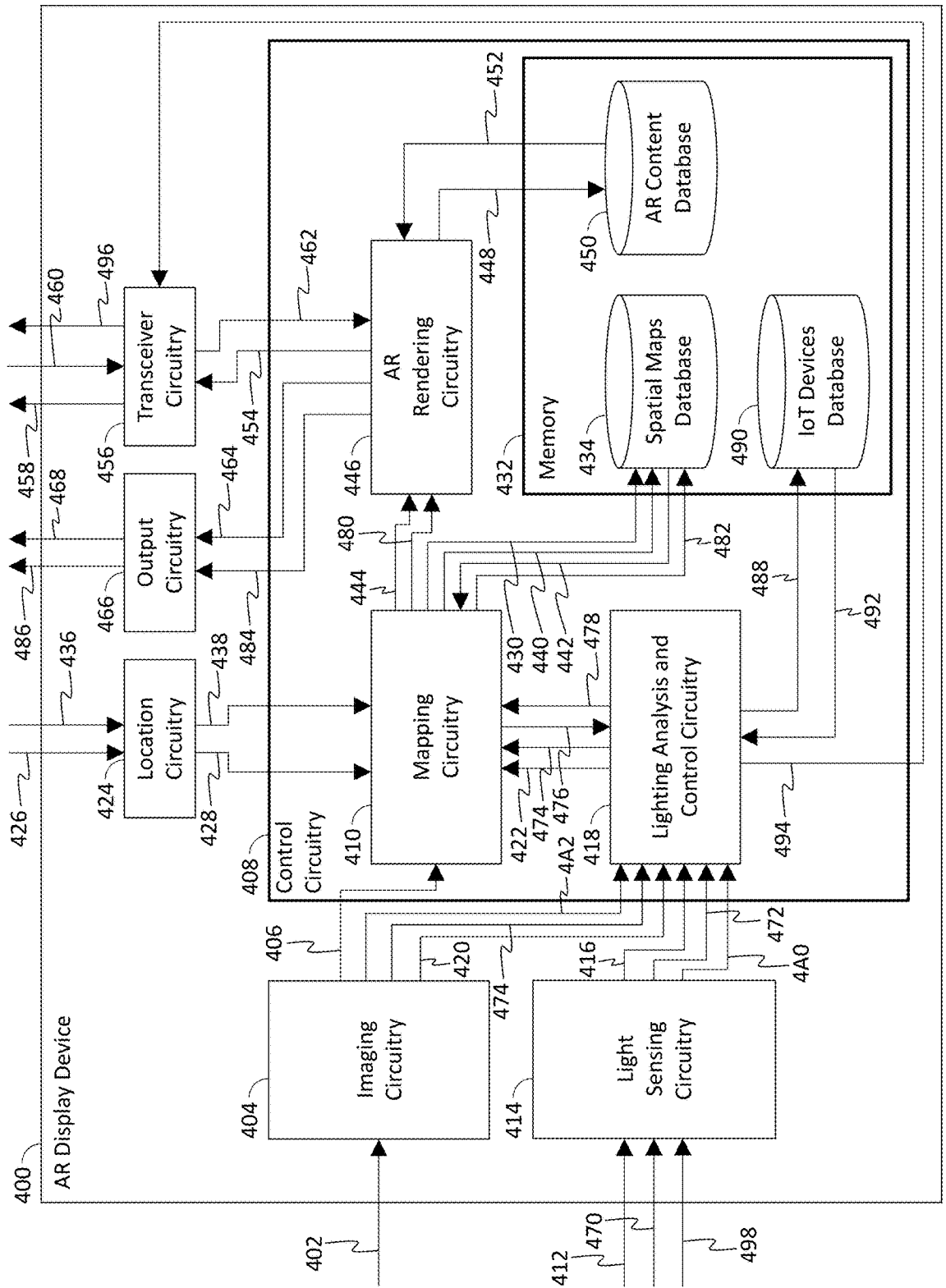
FIG. 4 is a block diagram showing components and data flow therebetween of an AR display device, in accordance with some embodiments of the disclosure.

FIG. 4 is a block diagram showing components and data flow therebetween of an AR display device, in accordance with some embodiments of the disclosure. AR display device 400 gathers 402 data representing the area surrounding AR device 400 using imaging circuitry 404. Imaging circuitry 404 may include one or more cameras, infrared sensors, LiDAR sensors, or other suitable devices for gathering three-dimensional data describing an environment. Imaging circuitry 404 transmits 406 the gathered imaging data to control circuitry 408, where it is received at mapping circuitry 410.

Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Transceiver circuitry 456 comprises a network connection over which data can be transmitted to and received from remote devices, such as an ethernet connection, Wi-Fi connection, mobile broadband interface, or connection employing any other suitable networking protocol.

Mapping circuitry 410 processes the imaging data to identify objects, such as walls, doors, furniture, etc., in the area surrounding AR display device 400. This may be accomplished using any suitable methods for AR environment processing. Based on the positions of detected objects, mapping circuitry 410 identifies a plurality of zones. Each zone may be an area in which no significant objects are present. For example, mapping circuitry 410 may assign each object a significance factor, where objects that ought not be obscured from the view of the user, such as doors or objects placed in the middle of room that may pose a tripping hazard, are assigned a high significance factor and objects that can be obscured are assigned a low significance factor. Mapping circuitry 410 may then identify areas that contain only low significance objects as individual zones. If a large area contains no high significance objects, such as a long wall, mapping circuitry 410 may split the area into two or more zones. This may depend on the number of content items or categories of content items to be displayed in the AR display.

AR display device 400 also captures 412 light intensity data at various positions in the area surrounding AR display device 400 using light sensing circuitry 414. Light sensing circuitry 414 may include a light level sensor, or other light measurement device. Light sensing circuitry 414 transmits 416 the light intensity data to control circuitry 408, where it is received using lighting analysis and control circuitry 418. In some embodiments, light sensing circuitry 414 may not be present, or may be occluded or blocked. In such cases, light measurements may be made using a camera, such as may be included in imaging circuitry 404, using Equation 1, above. Imaging circuitry 404 may transmit 420 imaging data to lighting analysis and control circuitry 418 for processing or may perform the necessary calculation and transmit 420 the calculated light level data to lighting analysis and control circuitry 418.

Lighting analysis and control circuitry 418 transmits 422 the gathered and/or calculated light levels for each position to mapping circuitry 410. In some embodiments, lighting analysis and control circuitry 418 first compares each light level to a threshold light level. The threshold light level may be set by AR display device 400 or by an application currently running on AR display device 400. Lighting analysis and control circuitry 418 may then determine which light levels exceed the threshold light level and only transmit those light levels to mapping circuitry 410. Lighting analysis and control circuitry 418 may also transmit positional information for corresponding to each light level. Mapping circuitry 410 then incorporates the light levels into a spatial map of the area surrounding AR display device 400.

AR display device 400, using location circuitry 424, obtains 426 location data describing the location at which AR display device 400 is being used. Location circuitry 424 may include a GPS module, Wi-Fi positioning module, or other circuitry suitable for determining a location of AR display device 400. Location circuitry 424 may also include orientation detection circuitry such as a compass, gyroscope, accelerometer, inertial measurement unit, etc. Location circuitry 424 transmits 428 the location data to mapping circuitry 410. This allows mapping circuitry 410 to associate the mapped area with a geographic location. Mapping circuitry 410 then transmits 430 the spatial map to memory 432 where it is stored in spatial maps database 434. Memory 432 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same.

When entering a location, AR display device 400 obtains 426 location data describing the location using location circuitry 424. Location circuitry 424 transmits 438 the location data to mapping circuitry 410. Mapping circuitry 410 transmits 440 a request to spatial maps database 434 to determine if a spatial map for the location has already been created. If so, spatial maps database 434 transmits 442 the spatial map associated with the location to mapping circuitry 410. Mapping circuitry 410 then transmits 444 the spatial map to AR rendering circuitry 446. AR rendering circuitry 446 transmits 448 a request to AR content database 450, stored in memory 432, for AR content to display. AR rendering circuitry 446 receives 452 the request content from AR content database 450. Alternatively or additionally, AR rendering circuitry 446 transmits 454 a request for AR content to transceiver circuitry 456. Transceiver circuitry 456 comprises a network connection over which data can be transmitted to and received from remote devices, such as an ethernet connection, Wi-Fi connection, mobile broadband interface, or connection employing any other suitable networking protocol. Transceiver circuitry in turn transmits 458 the request to an AR content server and receives 460 requested AR content. The received AR content is then transmitted 462 to AR rendering circuitry 446.

AR rendering circuitry 446 renders the AR content for display on the AR display. For example, AR rendering circuitry 446 processed AR media data for output in specific zones of the spatial map. If light level data is associated with a position located within a zone, AR rendering circuitry 446 may position AR content within that zone so that no content items are within the area described by the light level data. If it is not possible to position all AR content items assigned to a zone such that none are within the area described by the light level data, AR rendering circuitry 446 may position content items to avoid the highest light intensity areas, or may reassign one or more AR content items to another zone. Alternatively or additionally, AR rendering circuitry 446 may adjust or modify display of one or more AR objects to mitigate the effects of the light level. For example, AR rendering circuitry may increase a contrast of the AR content or darken an area surrounding the AR content. AR rendering circuitry 446 then transmits 464 the rendered AR content to output circuitry 466, where it is output 468 for display to the user.

During use of AR display device 400, light levels may be periodically or continuously monitored, as light levels may change over time. For example, sunlight may come in through an east-facing window in the morning but may no longer be intense enough to exceed the threshold light level in the afternoon. Similarly, light fixtures may be turned on during times when there is little or no sunlight (e.g., nighttime, period of cloud cover, etc.), but may be turned off when sunlight levels increase. At 470, AR display device 400, using light sensing circuitry 414 captures new light intensity data at various positions in the area surrounding AR display device 400. Light sensing circuitry 414 transmits 472 the new light intensity data lighting analysis and control circuitry 418. In embodiments where light sensing circuitry 414 is not be present, or is occluded or blocked, new light measurements may be made using a camera, such as may be included in imaging circuitry 404, using Equation 1, above. Imaging circuitry 404 may transmit 474 imaging data to lighting analysis and control circuitry 418 for processing or may perform the necessary calculation and transmit 474 the calculated light level data to lighting analysis and control circuitry 418.

Lighting analysis and control circuitry 418 compares the new light intensity data with the threshold light level. The threshold light level may be set by AR display device 400 or by an application currently running on AR display device 400, which may be different from a threshold set by a different application that was previously running. Lighting analysis and control circuitry 418 may then determine which light levels exceed the threshold light level. Lighting analysis and control circuitry 418 transmits 476 a request to mapping circuitry 410 for the spatial map currently in use. In response, mapping circuitry 410 transmits 476 the spatial map to lighting analysis and control circuitry 418. Lighting analysis and control circuitry 418 then compares the new light levels exceeding the threshold light levels with the light levels included in the spatial map. If a light level at a position stored in the spatial map has changed, the light intensity data for that position is updated. If the light level at that position no longer exceeds the threshold light level, the light level data for that position may be removed from the spatial map entirely. The position of any new light levels that exceed the threshold light level and are not indicated in the spatial map are added to the spatial map.

The updated spatial map is then transmitted 478 back to mapping circuitry 410. Mapping circuitry 410 then transmits the updated map to AR rendering circuitry 446. The updated spatial map is also transmitted 482 to spatial maps database 434 for storage. AR rendering circuitry 446 updates the position of AR objects based on any new light level data in the updated spatial map. AR rendering circuitry 446 then transmits 484 the newly rendered AR content to output circuitry 466, where it is output 486 to the user.

In some embodiments, mapping circuitry 410 may define "No Object Entry Zones" in the spatial map based on the light intensity at certain positions to prevent dynamically moving AR objects from entering areas where the light levels will cause reduced quality of experience with regard to the dynamically moving AR object. These positions of these zones may also be updated based on the new light level data. They may also be expanded or removed as lighting conditions in the area change.

In some embodiments, lighting conditions may be controlled by AR display device 400. For example, smart lights, smart windows, smart shades/curtains, etc. may be accessed through an IoT controller to alter the lighting conditions in the area of AR display device 400. Lighting analysis and control circuitry 418 transmits 488 a request to IoT devices database 490 stored in memory 432. Alternatively, IoT devices database 490 may be stored in a remote server or other user device. The request may be for controllable lighting devices (including window shades/curtains and smart glass windows) in the vicinity of AR display device 400. For example, AR display device 400 may transmit an identifier or other indicator of a current position within the area based on the location data. Lighting analysis and control circuitry 418 receives 492 a list of IoT lighting devices in the area of AR display device 400.

Using the list of IoT lighting devices in the area of AR display device 400, lighting control and analysis circuitry 418 may select a lighting device and transmit 494 a command to reduce the brightness of the lighting device to transceiver circuitry 456. Transceiver circuitry 456 in turn transmits 496 the command to either the IoT controller for the selected device, or directly to the device itself. AR display device 400 may, for example, transmit a command to a smart lightbulb to reduce its output power or brightness by 50%, or to a smart window shade to cover the portion of a window through which the sun is directly shining. In some embodiments, AR display device 400 may perform calibrations for each IoT lighting device to determine brightness levels corresponding to output levels of each lighting device. After instructing a lighting device to reduce its brightness, AR display device 400, using light sensing circuitry 414, captures 498 additional light intensity data and transmits 4A0 the additional light intensity data to lighting analysis and control circuitry 412. This may also be accomplished using imaging circuitry 404, as described above, which transmits 4A2 imaging data or calculated light levels to lighting analysis and control circuitry 418. If, based on the additional light intensity data, lighting analysis and control circuitry 418 determines that the light levels need further reduction, lighting analysis and control circuitry 418 may select another lighting device and instruct it to reduce its brightness as well. This process may continue until lighting control and analysis circuitry 418 determines that the light levels in the area are at or below the threshold light level.

Figure 5:
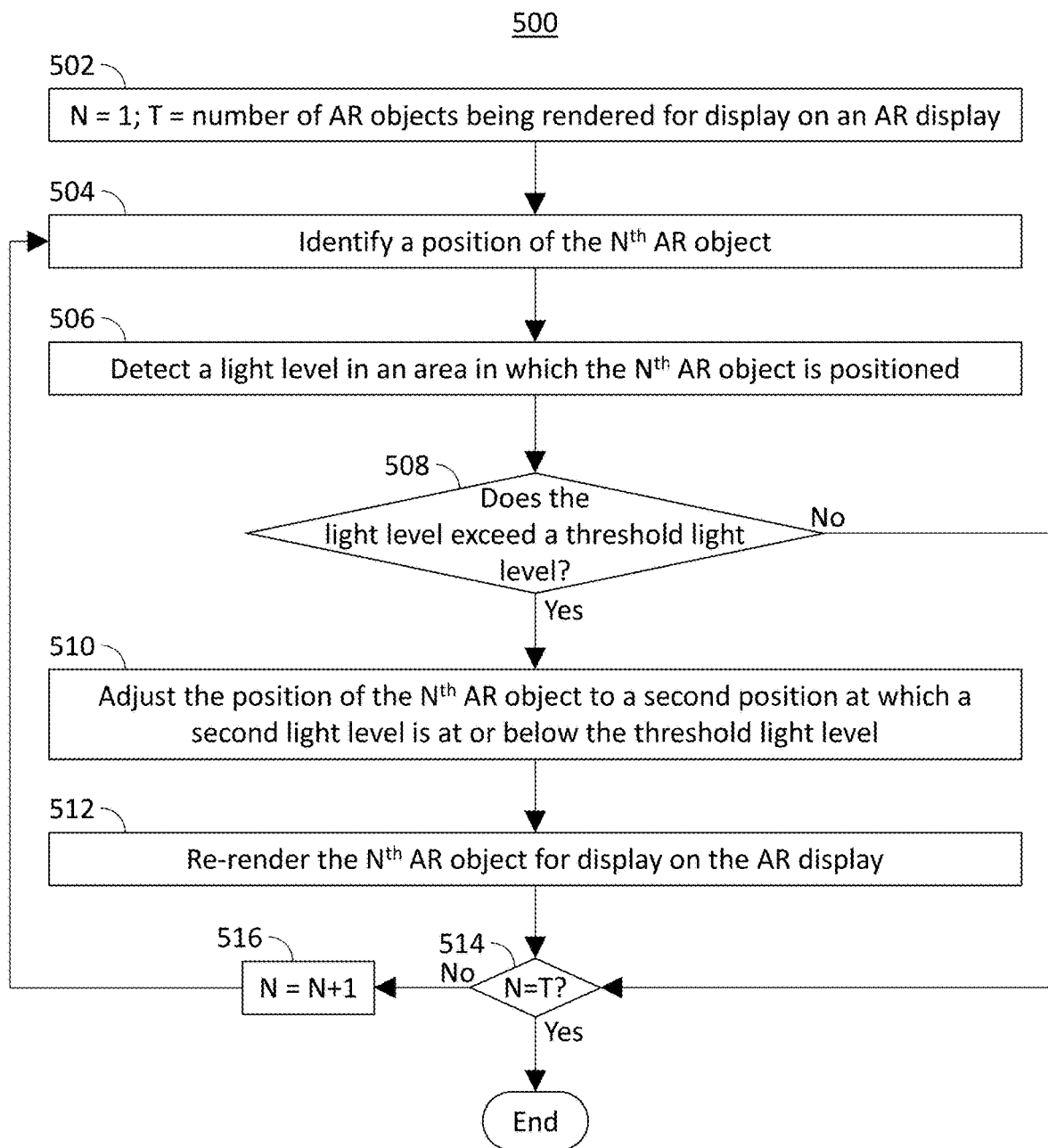
FIG. 5 is a flowchart representing an illustrative process for changing the position of an AR object based on light levels, in accordance with some embodiments of the disclosure.

FIG. 5 is a flowchart representing an illustrative process 500 for changing the position of an AR object based on light levels, in accordance with some embodiments of the disclosure. Process 500 may be implemented on control circuitry 408. In addition, one or more actions of process 500 may be incorporated into or combined with one or more actions of any other process or embodiment described herein.

At 502, control circuitry 408 initializes a counter variable N, setting its value to one, and a variable T representing the number of AR objects being rendered for display on an AR display. For example, control circuitry 408 may access an AR display configuration that is currently in use and count the number of unique AR objects included in the display configuration. Alternatively or additionally, control circuitry 418 may count the number of AR content streams being received from transceiver circuitry 456 for rendering.

At 504, control circuitry 408 identifies a position of the $N^{th}$ AR object. For example, control circuitry 408 may query the object for its current coordinates within the AR display. These coordinates may be relative to a reference position or to an anchor position of the zone to which the $N^{th}$ AR object is assigned. If the latter, control circuitry 408 may also retrieve coordinates of the anchor position relative to a reference point in order to identify the position of the AR object. At 506, control circuitry 408 detects a light level in an area in which the $N^{th}$ AR object is positioned. For example, control circuitry 408 may use a light sensor to measure light intensity in the area immediately surrounding the position at which the $N^{th}$ AR object is located.

At 508, control circuitry 408 determines whether the light level exceeds a threshold light level. For example, control circuitry 408 may compare a light measurement with a set threshold light level. The threshold light level may be set by the AR display device or may be set by an application currently running on the AR display device. If the light level exceeds the threshold light level ("Yes" at 508), then, at 510, control circuitry 408 adjusts the position of the $N^{th}$ AR object to a second position at which a second light level is at or below the threshold light level. For example, control circuitry 408 may measure light levels at multiple positions in the area surrounding the AR display device to identify areas that have light levels at or below the threshold light level. In some embodiments, the second position to which the $N^{th}$ AR object is moved may be outside a current field of view of the AR display. Control circuitry 408 may then generate for display in a peripheral portion of the AR display an indicator of the AR object and a direction in which the user may turn to see it. At 512, control circuitry 408 re-renders the $N^{th}$ AR object for display on the AR device at the second location.

After re-rendering the $N^{th}$ AR object, or if the light level in the area in which the $N^{th}$ AR object is positions does not exceed the threshold light level ("No" at 508), at 514, control circuitry 408 determines whether N is equal to T, meaning that the light level in the area at which each AR object is positioned has been checked. If N is not equal to T ("No" at 514), then, at 516, control circuitry increments the value of N by one, and processing returns to 504. If N is equal to T ("Yes" at 514), then the process ends.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
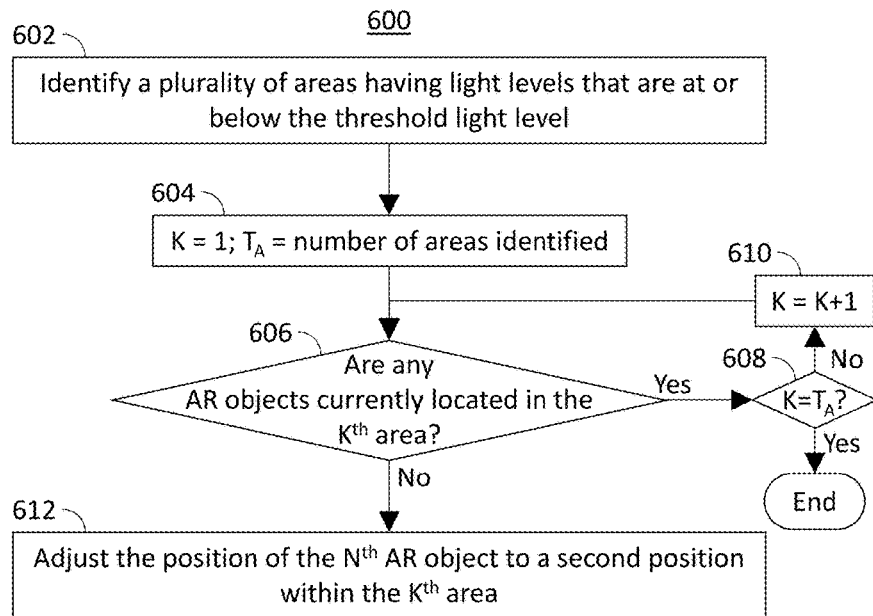
FIG. 6 is a flowchart representing an illustrative process for selecting an area to which an AR object is to be repositioned, in accordance with some embodiments of the disclosure.

FIG. 6 is a flowchart representing an illustrative process 600 for selecting an area to which an AR object is to be repositioned, in accordance with some embodiments of the disclosure. Process 600 may be implemented on control circuitry 408. In addition, one or more actions of process 600 may be incorporated into or combined with one or more actions of any other process or embodiment described herein.

At 602, control circuitry 408 identifies a plurality of areas having light levels that are at or below the threshold light level. For example, control circuitry 408 may compare light levels measured at different positions and compare them with the threshold light level. If the light level at a position is below the threshold light level, light levels are measured at adjacent positions, moving progressively farther from the position until the measured light level reaches the threshold light level. The area between positions at which the threshold light level was reached is then identified as an area having a light level at or below the threshold. At 604, control circuitry 408 initializes a counter variable K, setting its value to 1, and a variable $T_A$ representing the number of areas identified.

At 606, control circuitry 408 determines whether any AR objects are located in the $K^{th}$ area. For example, control circuitry may query each AR object for its position information and compare coordinates contained therein with the boundary of the $K^{th}$ area. In some embodiments, control circuitry 408 may first determine whether the $K^{th}$ area is within a zone defined in the current AR display configuration. If so, control circuitry 408 may limit its query of AR objects to those objects assigned to the zone. If any AR objects are currently location in the $K^{th}$ area ("Yes" at 606), then, at 608, control circuitry 408 determines whether K is equal to $T_A$, meaning that all areas have been considered for repositioning of the $N^{th}$ AR object. If K is not equal to $T_A$ ("No" at 608), then, at 610, control circuitry 408 increments the value of K by one, and processing returns to 606. If K is equal to $T_A$ ("Yes" at 608), the process ends.

If no AR objects are currently located in the $K^{th}$ area ("No" at 606), then, at 610, control circuitry 408 adjusts the position of the $N^{th}$ AR object to a second position within the $K^{th}$ area. This may be accomplished using methods described below in connection with FIG. 7.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
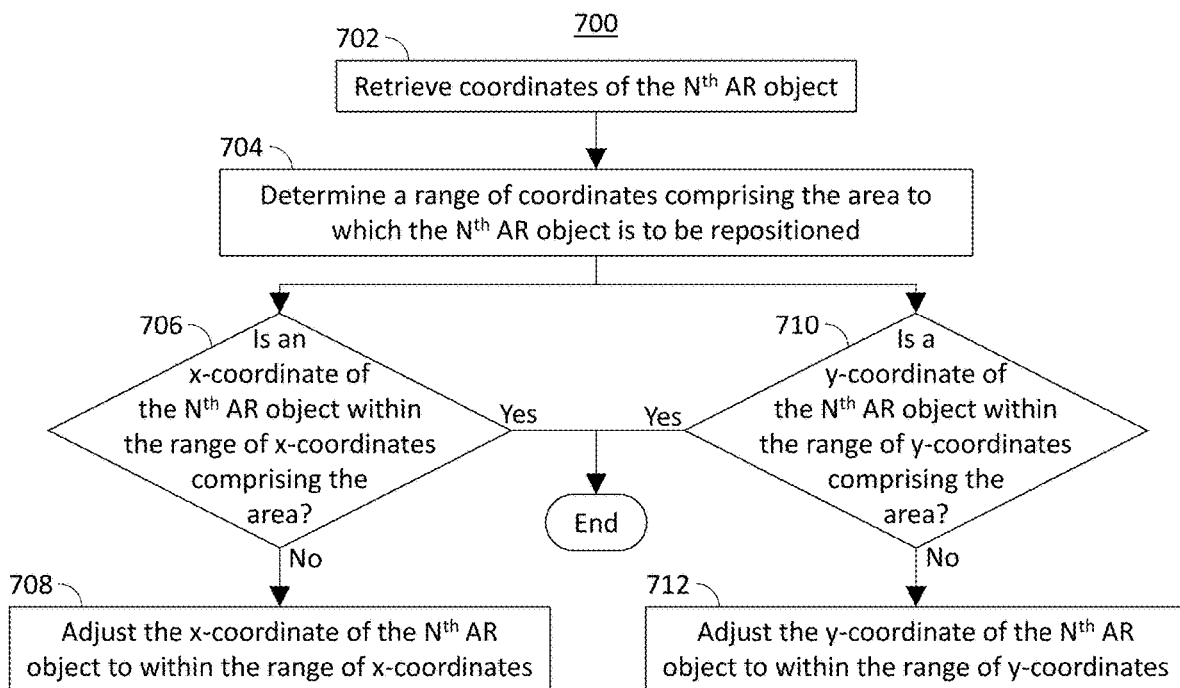
FIG. 7 is a flowchart representing an illustrative process for repositioning an AR object in the selected area, in accordance with some embodiments of the disclosure.

FIG. 7 is a flowchart representing an illustrative process 700 for repositioning an AR object in the selected area, in accordance with some embodiments of the disclosure. Process 700 may be implemented on control circuitry 408. In addition, one or more actions of process 700 may be incorporated into or combined with one or more actions of any other process or embodiment described herein.

At 702, control circuitry 408 retrieves coordinates of the $N^{th}$ AR object. For example, control circuitry 408 queries the $N^{th}$ AR object for its current position. At 704, control circuitry 408 determines a range of coordinates comprising the area to which the $N^{th}$ AR object is to be repositioned. For example, control circuitry 408 may retrieve boundary positions of a zone defined in an AR display configuration currently in use. Alternatively, control circuitry 408 may use methods described above in connection with FIG. 6 to identify an area having a light level below the threshold light level.

At 706, control circuitry 408 determines whether an x-coordinate of the $N^{th}$ AR object is within the range of x-coordinates comprising the area. For example, control circuitry 408 may determine whether the x-coordinate of the AR object is between two opposing boundaries of the area in the x-axis (e.g., the boundary lines are perpendicular to the x-axis). If so ("Yes" at 706), no adjustment of the x-coordinate of the AR object is required. Otherwise ("No" At 706), at 708, control circuitry 408 adjusts the x-coordinate of the $N^{th}$ AR object to within the range of x-coordinates of the area. Similarly, at 710, control circuitry 408 determines whether the y-coordinate of the $N^{th}$ AR object is within the range of y-coordinates comprising the area. If so ("Yes" at 710), no adjustment of the y-coordinate of the $N^{th}$ AR object is required, Otherwise ("No" at 710), at 712, control circuitry 408 adjusts the y-coordinate of the $N^{th}$ AR object to within the range of y-coordinates of the area.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
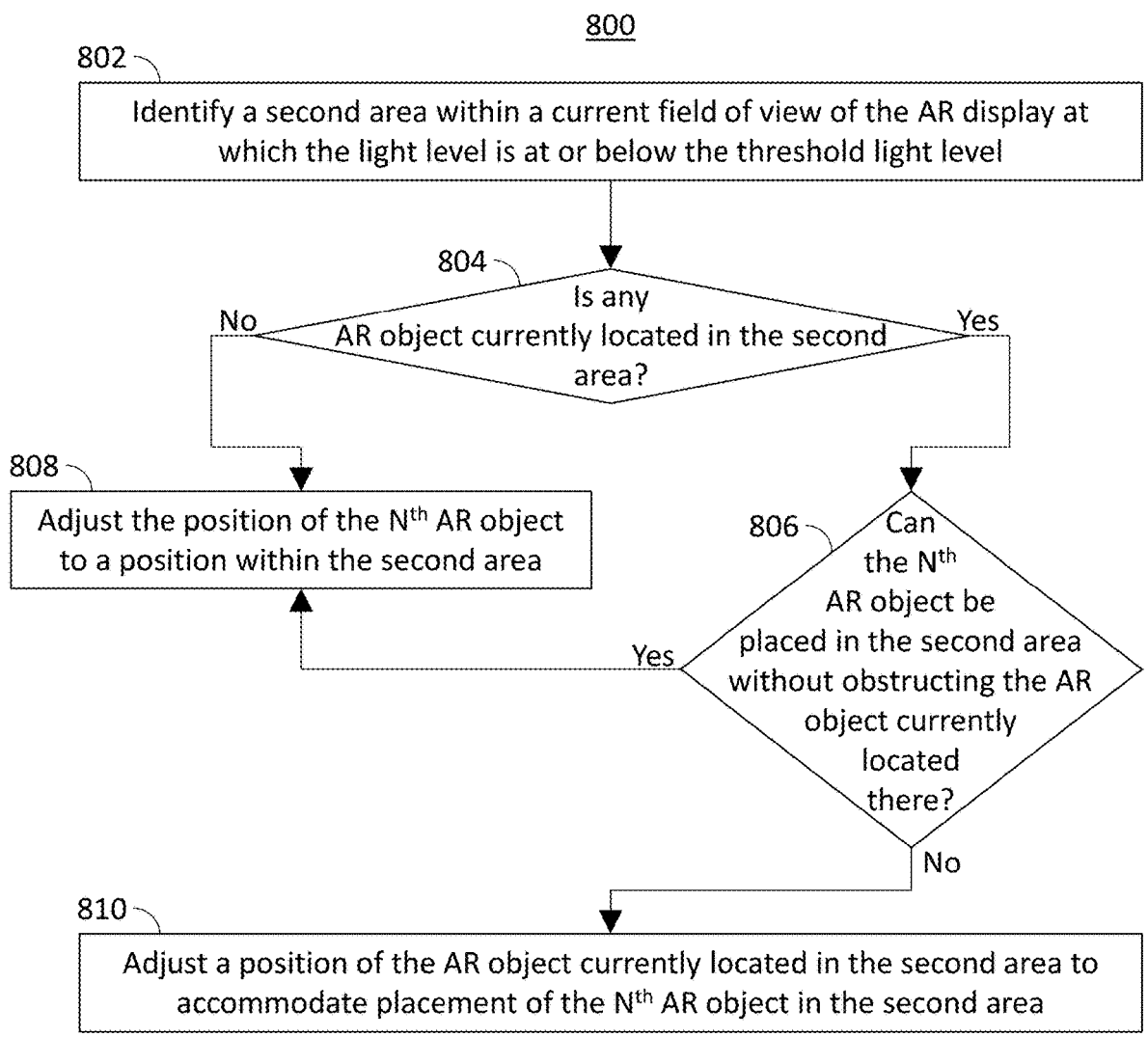
FIG. 8 is a flowchart representing an illustrative process for adjusting the position of a second AR object in the selected area to accommodate placement of the AR object, in accordance with some embodiments of the disclosure.

FIG. 8 is a flowchart representing an illustrative process 800 for adjusting the position of a second AR object in the selected area to accommodate placement of the AR object, in accordance with some embodiments of the disclosure. Process 800 may be implemented on control circuitry 408. In addition, one or more actions of process 800 may be incorporated into or combined with one or more actions of any other process or embodiment described herein.

At 802, control circuitry 408 identifies a second area within a current field of view of the AR display at which the light level is at or below the threshold light level. For example, control circuitry 408 may use methods similar to those described above in connection with FIG. 6 to identify an area having a light level at or below the threshold light level. At 804, control circuitry 408 determines whether any AR object is currently located in the second area. This may be accomplished using methods described above in connection with FIG. 6.

If an AR object is currently location in the second area ("Yes" at 804), then, at 806, control circuitry 408 determines whether the $N^{th}$ AR object can be placed in the second area without obstructing the AR object(s) currently located there. For example, control circuitry 408 may determine a size of the second area and compare it with a size of the AR object(s) currently located in the second area. Control circuitry 408 may then calculate an amount of space remaining in the area, and whether it is sufficient for placement of the $N^{th}$ AR object. If so ("Yes" at 806), or if no AR object are currently located in the second are ("No" at 804), at 808, control circuitry 408 adjusts the position of the $N^{th}$ AR object to a position within the second area. This may be accomplished using methods described above in connection with FIG. 7.

If the $N^{th}$ AR object cannot be placed in the second area without obstructing the AR object(s) currently located there ("No" at 806), then, at 810, control circuitry 408 adjusts the position or size of the AR object(s) currently located in the second area to accommodate placement of the $N^{th}$ AR object in the second area. For example, control circuitry 408 may determine, based on the size of the second area and the amount of space remaining in the area after display of the AR object(s) already placed there, whether the AR object(s) currently located there can be repositioned within the area to create a space of sufficient size for the $N^{th}$ AR object to be placed there. If so, the AR objects are repositioned to create a sufficient space.

In another example, control circuitry 408 may select one or more AR objects currently located in the second area to be resized. This selection may be based on the original size or priority of each AR object. Control circuitry 408 may thus select, for example, the largest AR object or the lowest priority AR object to be resized. In some cases, both the original size and priority of each AR object may be accounted for when selecting an AR object to be resized. For example, a large AR object may also have the highest priority of all AR objects currently located in the second area. Control circuitry 408 may therefore refrain from selecting that AR object and instead select a second largest AR object having a lower priority level. Once an AR object is selected for resizing, control circuitry 408 resizes the selected AR object in at least one dimension. For example, if the selected AR object is a two-dimensional virtual TV display, both the length and width of the object may be reduced. If the virtual TV display is displayed within an AR object having the apparent volume of a physical display unit (e.g., a television), the depth of the AR object may not need to be reduced. However, for a three-dimensional AR object, control circuitry 408 reduces all three dimensions in order to maintain the proportions of the AR object. In some embodiments, control circuitry 408 may calculate reduced dimensions using a scaling factor. Control circuitry 408 may multiply each dimension to be reduced by the scaling factor. In this way, when multiple dimensions are reduced, the proportions of the AR object are maintained.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
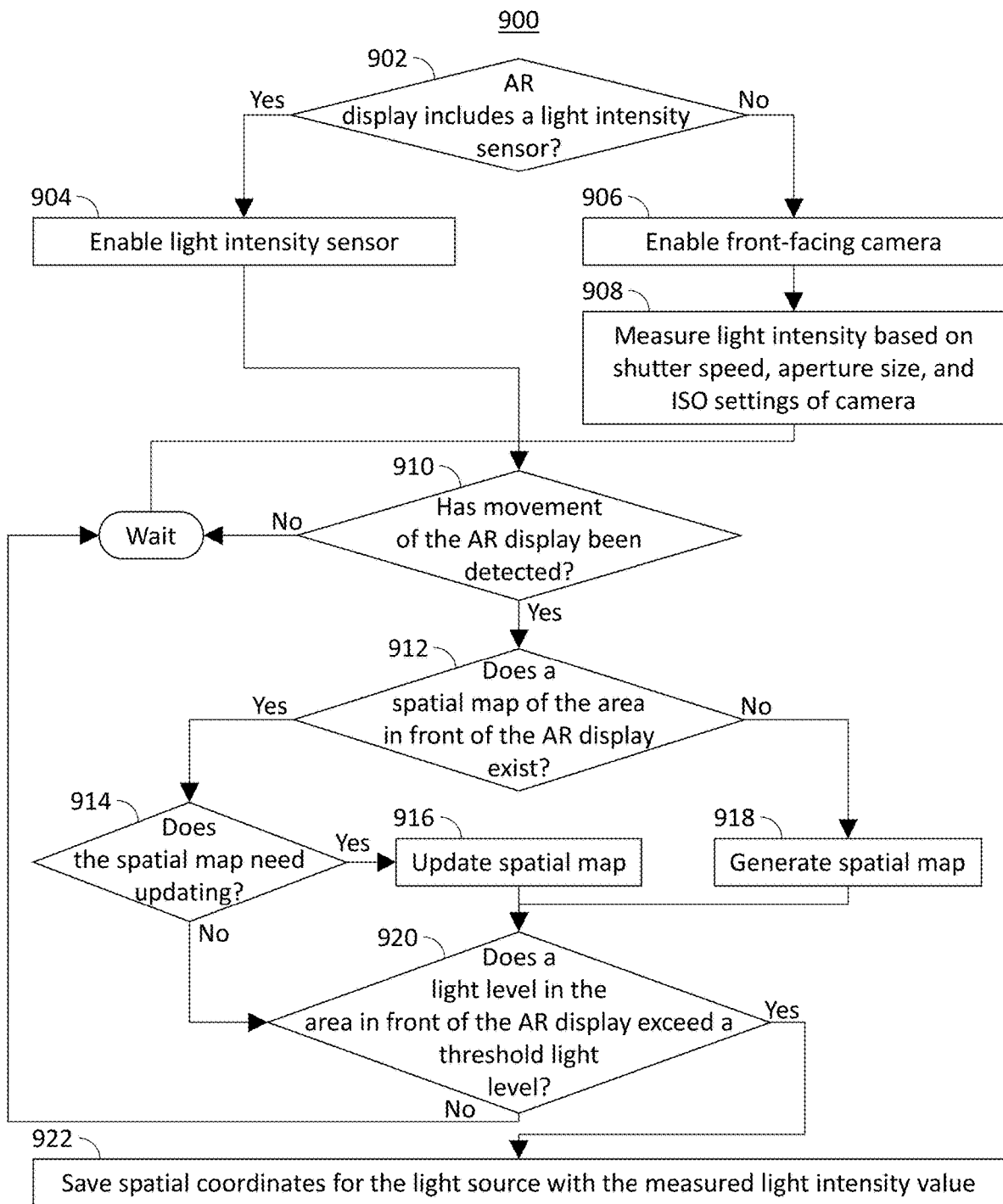
FIG. 9 is a flowchart representing an illustrative process for saving light intensity data in a spatial map of the area, in accordance with some embodiments of the disclosure.

FIG. 9 is a flowchart representing an illustrative process 900 for saving light intensity data in a spatial map of the area, in accordance with some embodiments of the disclosure. Process 900 may be implemented on control circuitry 408. In addition, one or more actions of process 900 may be incorporated into or combined with one or more actions of any other process or embodiment described herein.

At 902, control circuitry 408 determines whether the AR display includes a light intensity sensor. For example, control circuitry 408 may query a device configuration file or other data structure in which input devices, including sensors, are listed. If a light intensity sensor is available, control circuitry 408 may perform further checks to ensure that the light intensity sensor is functional and not occluded. If a light intensity sensor is available ("Yes" at 902), then, at 904, control circuitry 408 enables the light intensity sensor. If no light intensity sensor is available, or the light intensity sensor is non-functional ("No" at 902), then, at 906, control circuitry 408 enables a front-facing camera of the AR device and, at 908, measures light intensity based on shutter speed, aperture size, and ISO settings of the camera using Equation 1 above.

At 910, control circuitry 408 determines whether movement of the AR display has been detected. This may be accomplished through processing of image data captured using a camera. For example, the position of physical objects in the area may be tracked within a frame of successive images captured by the camera. If a physical object moves more than a threshold amount within the captured frame, motion has been detected. Alternatively or additionally, through data captured by motion sensors such as accelerometers, inertial measurement units, gyroscopes, etc. If no movement has been detected ("No" at 910), then control circuitry 408 waits a predetermined amount of time (e.g., one second) before returning to 910.

If movement of the AR display has been detected ("Yes" at 910), then, at 912, control circuitry 408 determines whether a spatial map of the area in front of the AR display exists. For example, control circuitry 408 determines a location of the area in front of the AR display and queries a database of spatial maps for a map associated with the identified location. If a spatial map of the area exists ("Yes" at 912), then, at 914, control circuitry 408 determines whether the spatial map needs updating. For example, control circuitry 408 may perform a scan of the area and compare it to the spatial map. If any objects contained in the spatial map are nor present in the scan, or if objects present in the scan are not contained in the spatial map, control circuitry 408 may determine that the spatial map must be updated ("Yes" at 914) and, at 916, updates the spatial map based on the scan. This may be a complete overwrite of the existing spatial map, or a modification of the existing spatial map to incorporate data representing objects present in the scan that are not contained in the spatial map.

If no spatial map of the area in front of the AR display exists ("No" at 912), then, at 918, control circuitry 408 performs a new scan and generates a new spatial map for the area based on the scan. After generating a new spatial map, updating an existing spatial map, or if the existing spatial map needs no updating, at 920, control circuitry determines whether a light level in the area in front of the AR display exceeds the threshold light level. This may be accomplished using methods described above in connection with FIG. 5. If the light level does not exceed the threshold light level ("No" at 920), then control circuitry 408 waits a predetermined amount of time (e.g., 1 second) before returning to 910. If a light level in the area in front of the AR display exceeds the threshold light level ("Yes" at 920), then, at 922, control circuitry 408 saves spatial coordinates for the light source with the measured light intensity value. Control circuitry 408 may store the spatial coordinates and measured light intensity value as part of the spatial map, or in a separate data structure.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
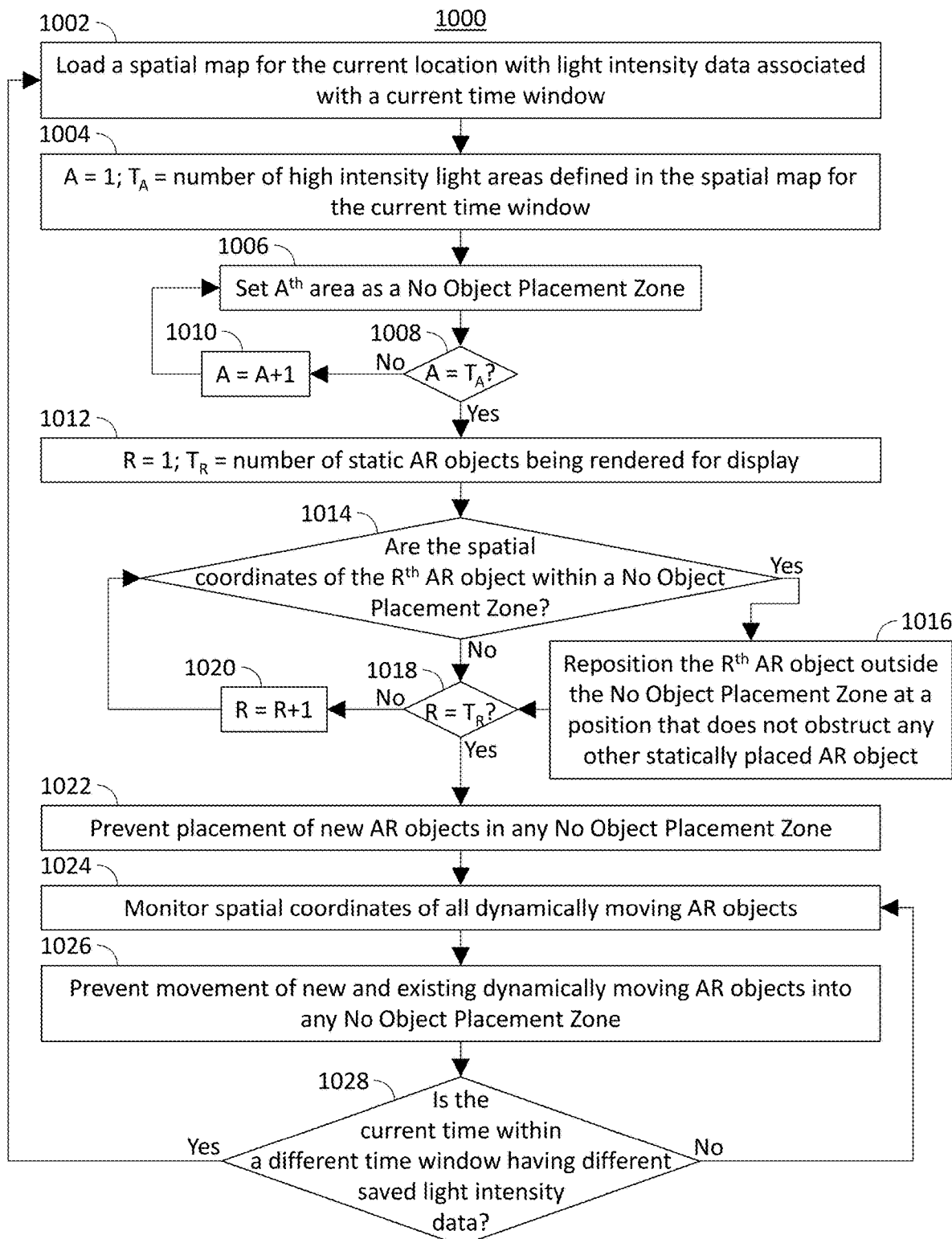
FIG. 10 is a flowchart representing an illustrative process for relocating static AR objects from, and preventing dynamic AR objects from entering into, high light intensity areas, in accordance with some embodiments of the disclosure.

FIG. 10 is a flowchart representing an illustrative process 1000 for relocating static AR objects from, and preventing dynamic AR objects from entering into, high light intensity areas, in accordance with some embodiments of the disclosure. Process 1000 may be implemented on control circuitry 408. In addition, one or more actions of process 1000 may be incorporated into or combined with one or more actions of any other process or embodiment described herein.

At 1002, control circuitry 408 loads a spatial map for the current location with light intensity data associated with a current time window. For example, multiple spatial maps may be saved for a given location, where each map is further associated with a different time of day. Light intensity values stored in each version of the map will differ, as lighting conditions, both natural and artificial, change over the course of a day. Control circuitry 408 may query a spatial maps database for a map associated with both the location and the current time. At 1004, control circuitry 408 initializes a counter variable A, setting its value to one, and a variable $T_A$ representing the number of high intensity light areas defined in the spatial map for the current time window. At 1006, control circuitry 408 sets the $A^{th}$ area as a No Object Placement Zone (NOPZ). This indicates that the light intensity level in the area defined by the NOPZ is too high and that AR objects are not to be placed in that area. At 1008, control circuitry 408 determines whether A is equal to $T_A$, meaning that all NOPZs have been set. If A is not equal to $T_A$ ("No" at 1008), then, at 1010, control circuitry increments the value of A by one and processing returns to 1006.

If A is equal to $T_A$ ("Yes" at 1008), then, at 1012, control circuitry 408 initializes another counter variable R, setting its value to one, and a variable $T_R$ representing the number of static AR objects being rendered for display. At 1014, control circuitry 408 determines whether the spatial coordinates of the $R^{th}$ static AR object are within a NOPZ. For example, control circuitry 408 may query the $R^{th}$ static AR object for coordinate describing its current position with the AR display. These coordinates of the $R^{th}$ static AR object are then compared with boundary coordinates of all NOPZs to determine whether they fall between the boundary coordinates of any of the NOPZs. If so ("Yes" at 1014), then, at 1016, control circuitry 408 repositions the $R^{th}$ static AR object outside the NOPZs at a position that does not obstruct any other statically placed AR object. For example, control circuitry 408 may identify positions of other static AR objects within the same zone as the $R^{th}$ static AR object that are not within the NOPZs. Then, using methods similar to those described above in connection with FIG. 8, control circuitry 408 may reposition the $R^{th}$ static AR object within the zone without obstructing other static AR objects within the zone. Alternatively, control circuitry 408 may reposition the $R^{th}$ static AR object to another zone using methods similar to those described above in connection with FIGS. 5 and 6.

After repositioning the $R^{th}$ static AR object, or if the spatial coordinated of the $R^{th}$ static AR object are not within any NOPZs ("No" at 1014), at 1018, control circuitry 408 determine whether R is equal to $T_R$, meaning that the spatial coordinates of all static AR objects being rendered for display have been checked to determine if they fall within any NOPZ. If R is not equal to $T_R$ ("No" at 1018), then, at 1020, control circuitry 408 increments the value of R by one, and processing returns to 1014.

If R is equal to $T_R$ ("Yes" at 1018), then, all static objects have been repositioned from NOPZs. At 1022, control circuitry 408 prevents placement of new AR objects in any NOPZ. This may be accomplished using methods similar to those described above when a new AR object is initially positioned for rendering. Control circuitry 408 then monitors the spatial coordinates of all dynamically moving AR objects. For example, control circuitry 408 may periodically or continuously track the coordinates of each dynamically moving AR object. Control circuitry 408 may use the change in coordinate over time to determine a trajectory of each dynamically moving AR object and predict any interactions of each dynamically moving AR object with other AR objects or edges of the AR display that would change the direction of movement for each dynamically moving AR object. At 1026, control circuitry 408 prevents movement of new and existing dynamically moving AR objects into any NOPZ. For example, control circuitry 408 may determine that a dynamically moving AR object will enter a NOPZ if it continues to move along its current trajectory. Control circuitry 408 may update a vector associated with the movement of the dynamically moving AR object to alter the trajectory of the dynamically moving AR object so that it avoids the NOPZ. Alternatively, control circuitry 408 may treat the boundary of the NOPZ as a point at which the dynamically moving AR object changes direction, similar to the edge of the AR display. For example, the dynamically moving AR object may "bounce" off away from the NOPZ and continue on a different trajectory.

At 1028, control circuitry 408 determines whether the current time is within a different time window having different saved light intensity data. If not ("No" at 1028), then processing returns to 1024 and control circuitry 408 continues monitoring the spatial coordinates of all dynamically moving AR objects. If the current time is within a different time window having different saved light intensity data ("Yes" at 1028), then processing returns to 1002, where control circuitry 408 loads a spatial map and light intensity data associated with the current time window.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
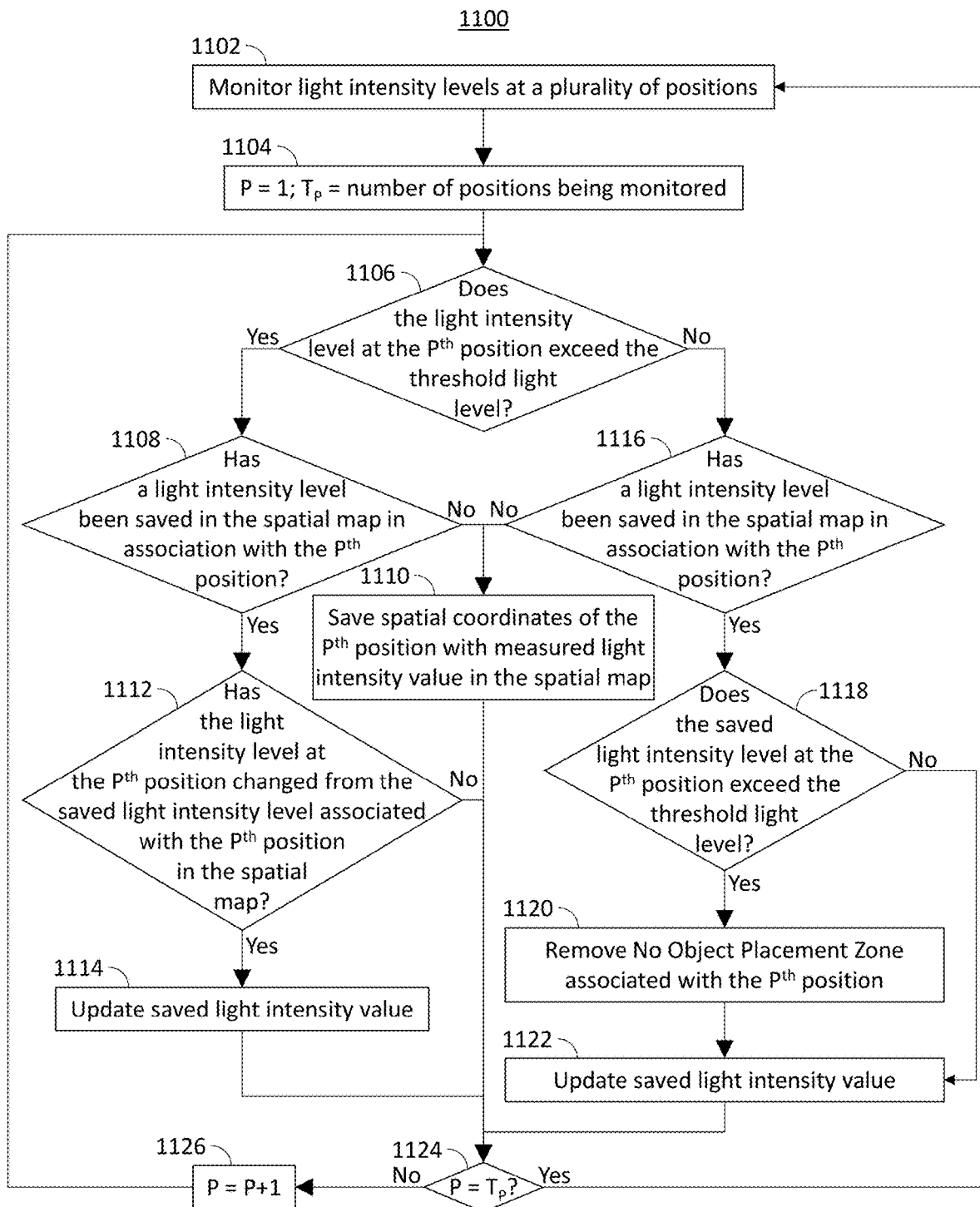
FIG. 11 is a flowchart representing an illustrative process for updating saved light intensity data in response to changing lighting conditions, in accordance with some embodiments of the disclosure.

FIG. 11 is a flowchart representing an illustrative process 1100 for updating saved light intensity data in response to changing lighting conditions, in accordance with some embodiments of the disclosure. Process 1100 may be implemented on control circuitry 408. In addition, one or more actions of process 1100 may be incorporated into or combined with one or more actions of any other process or embodiment described herein.

At 1102, control circuitry 408 monitors light intensity levels at a plurality of positions. For example, control circuitry uses one or more light sensor and/or one or more cameras to periodically measure light intensity levels in the area surrounding the AR display device. At 1104, control circuitry 408 initializes a counter variable P, setting its value to one, and a variable $T_P$ representing the number of positions being monitored. At 1106, control circuitry 408 determines whether the light intensity level at the $P^{th}$ positions exceeds the threshold light level. This may be accomplished using methods described above in connection with FIG. 5.

If the light intensity level at the $P^{th}$ position exceeds the threshold light level ("Yes" at 1106), then, at 1108, control circuitry 408 determines whether a light intensity level has been saved in the spatial map in association with the $P^{th}$ position. For example, control circuitry 408 may retrieve coordinates of the $P^{th}$ position and query the spatial map for light intensity data related to those coordinates. If the query returns no light intensity data, then control circuitry 408 determines that no light intensity data for the $P^{th}$ position has been saved in the spatial map ("No" at 1108), and, at 1110, saves spatial coordinates of the $P^{th}$ position along with the measured light intensity level in the spatial map.

If the query returns light intensity data values, then control circuitry 408 determines that light intensity data for the $P^{th}$ position was saved in the spatial map ("Yes" at 1108) and, at 1112 determines whether the light intensity level at the $P^{th}$ position has changed from the saved light intensity level associated with the $P^{th}$ position in the spatial map. For example, control circuitry 408 may compare the measured light intensity level with the saved light intensity level. If the measured light intensity level has changed from the saved light intensity level by at least a threshold amount, then control circuitry may determine that the light intensity level at the $P^{th}$ position has changed from the saved light intensity level. If so ("Yes" at 1112), then, at 1114, control circuitry 408 updates the saved light intensity value in the spatial map with the new measured light intensity level. This update may be made only to the copy of the spatial map in active memory (e.g., RAM) of the AR display device and not to the copy of the same version of the spatial map stored in non-volatile storage (e.g., spatial maps database 434).

If the light intensity level at the $P^{th}$ position does not exceed the threshold light level ("No" at 1106), then, at 1116, control circuitry 408 determines whether a light intensity level has been saved in the spatial map in association with the $P^{th}$ position, just as at 1108. If no light intensity level has been saved in associated with the $P^{th}$ position ("No" at 1116), then processing continues to 1110 where control circuitry 408 saves spatial coordinates of the $P^{th}$ position with the measured light intensity value in the spatial map. If a light intensity level has been saved in associated with the $P^{th}$ position ("Yes" at 1116), then, at 1118, control circuitry 408 determines whether the saved light intensity level at the $P^{th}$ position exceeds the threshold light level. For example, control circuitry 408 may retrieve from the spatial map the light intensity value stored in associated with the $P^{th}$ position and compare it with the threshold light level. If the saved light intensity level at the $P^{th}$ position exceeds the threshold light level ("Yes" at 1118), then, at 1120, control circuitry 408 removes a NOPZ associated with the $P^{th}$ position, as there is no longer a high intensity light source at that location. After removing the NOPZ, or if the saved light intensity level at the $P^{th}$ position does not exceed the threshold light level ("No" at 1118), at 1122, control circuitry updates the saved light intensity value associated with the $P^{th}$ position, just as at 1114.

After updating the saved light intensity value for the $P^{th}$ position within the spatial map (at 1114 or 1122), or after saving spatial coordinates of the $P^{th}$ position with the measured light intensity value in the spatial map (at 1110), at 1124, control circuitry 408 determines whether P is equal to $T_P$, meaning that the light level at each monitored position has been processed. If P is not equal to $T_P$ ("No" at 1124), then, at 1126, control circuitry 408 increments the value of P by one, and processing return to 1106. If P is equal to $T_P$ ("Yes" at 1124), then processing returns to 1102 where control circuitry again monitors the light intensity levels at the plurality of positions or a different plurality of positions, depending on the field of view of the AR display.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
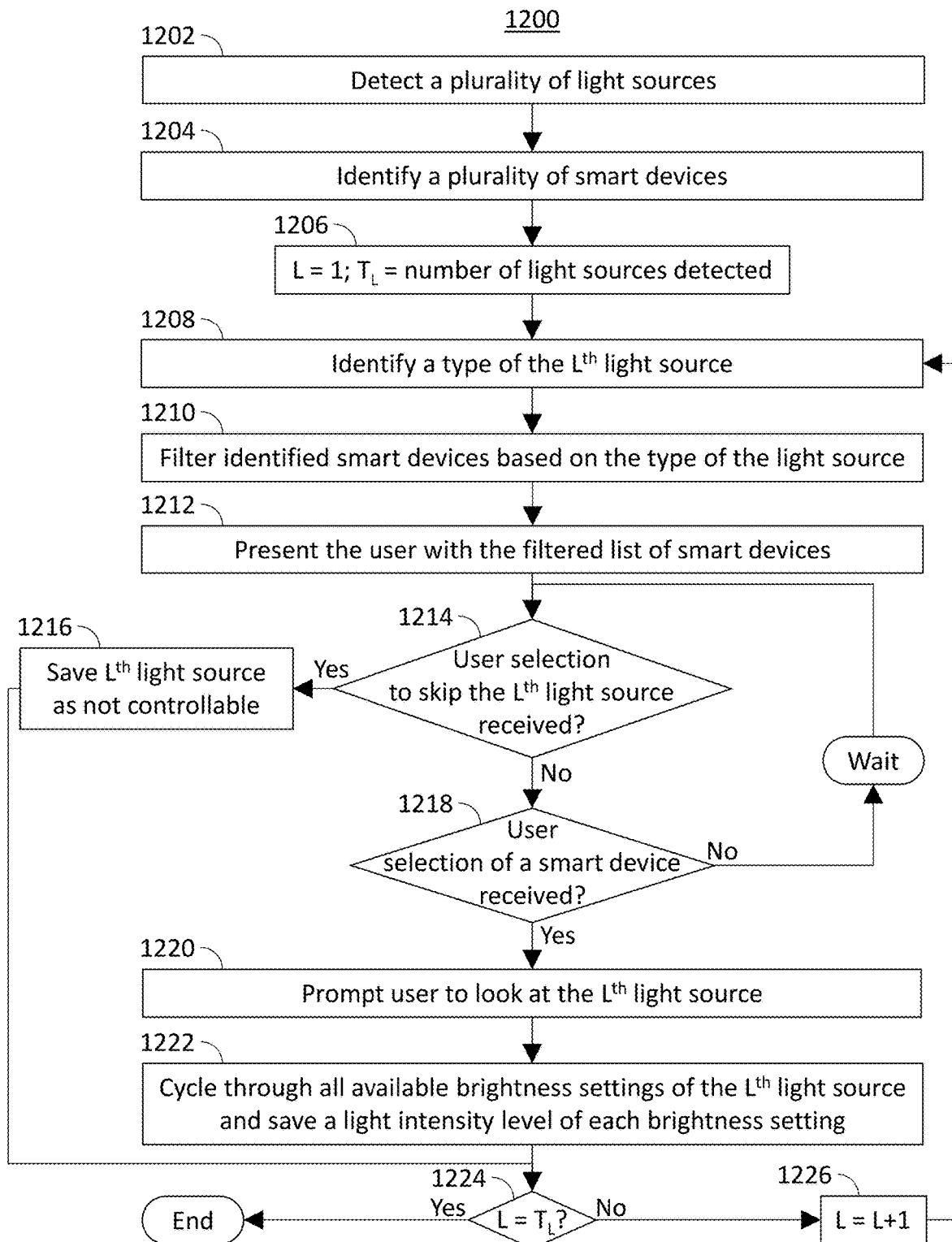
FIG. 12 is a flowchart representing an illustrative process for registering smart light sources and calibrating light intensity control for each smart light source, in accordance with some embodiments of the disclosure.

FIG. 12 is a flowchart representing an illustrative process 1200 for registering smart light sources and calibrating light intensity control for each smart light source, in accordance with some embodiments of the disclosure. Process 1200 may be implemented on control circuitry 408. In addition, one or more actions of process 1200 may be incorporated into or combined with one or more actions of any other process or embodiment described herein.

At 1202, control circuitry 408 detects a plurality of light sources. For example, control circuitry 408 may localize the highest intensity light levels detected using the light sensor(s) or camera(s). Control circuitry 408 may also determine spatial coordinates associated with each detected light source. At 1204, control circuitry 408 identifies a plurality of smart devices. For example, control circuitry 408 may query a smart device database or may access a smart device controller application. Control circuitry 408 may also interface with one or more standalone IoT controllers to identify all IoT devices controlled thereby.

At 1206, control circuitry 408 initializes a counter variable L, setting its value to one, and a variable $T_L$ representing the number of light sources detected. At 102, control circuitry 408 identifies a type of the $L^{th}$ light source. For example, control circuitry 408 may perform image recognition to identify the object emitting the detected light.

At 1210, control circuitry 408 filters the identified smart devices based on the type of the light source and, at 1212, presents the user with the filtered list of smart devices. Control circuitry may further make a preliminary identification of the smart device associated with the light source. Control circuitry may determine from the smart device controller application or standalone IoT controller, a location for each smart device. Control circuitry 408 may then correlate the location of each smart device with the spatial coordinates of each detected light source. When a match is detected, control circuitry 408 may preliminarily identify the matching smart device as the light source. This device may be placed at the top of the filtered list of smart devices.

At 1214, control circuitry 408 determines whether a user selection to skip the $L^{th}$ light source has been received. For example, the $L^{th}$ light source may not be a controllable smart device. If a selection to skip has been received ("Yes" at 1214), then at 1216, control circuitry 408 saves the $L^{th}$ light source as not controllable. If no skip selection was received ("No" at 1214), then, at 1218, control circuitry 408 determines whether a user selection of a smart device has been received. If neither a skip selection nor a selection of smart device has been received for the $L^{th}$ light source ("No" at 1218), control circuitry 408 continues to wait for a selection, returning to 1214.

If a selection of a smart device has been received ("Yes" at 1218), then, at 1220, control circuitry 408 prompts the user to look at the $L^{th}$ light source with the AR display device. This allows control circuitry 408 to most accurately measure the light intensity of the $L^{th}$ light source. At 1222, using the smart controller application or standalone IoT controller, control circuitry 408 cycles through all available brightness settings of the $L^{th}$ light source and saves a light intensity level of each brightness setting. For example, control circuitry 408 may set a smart lightbulb to its maximum output level and incrementally decrease its output level in the smallest available increments. Control circuitry 408 records a light intensity level of the lightbulb at each output level. For smart glass, control circuitry 408 may set the glass to full transparency, then incrementally increase the darkness or opacity of the glass, recording light intensity levels at each increment. Similarly, control circuitry 408 may raise a smart window shade to its fullest open position and incrementally close the shade, recording light levels at each increment. In some embodiments, before cycling through the settings of a smart device, control circuitry 408 stores a current setting. After cycling through the settings of the smart device, control circuitry 408 may then restore the previous setting.

After cycling through the available brightness settings of the $L^{th}$ light source (at 1222), or after saving the $L^{th}$ light source as not controllable (at 1216), at 1224, control circuitry 408 determines whether L is equal to $T_L$, meaning that all detected light sources have been processed. If L is not equal to $T_L$ ("No" at 1224), then, at 1226, control circuitry 408 increments the value of L by one, and processing returns to 1208. Otherwise ("Yes" at 1224), the process ends.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
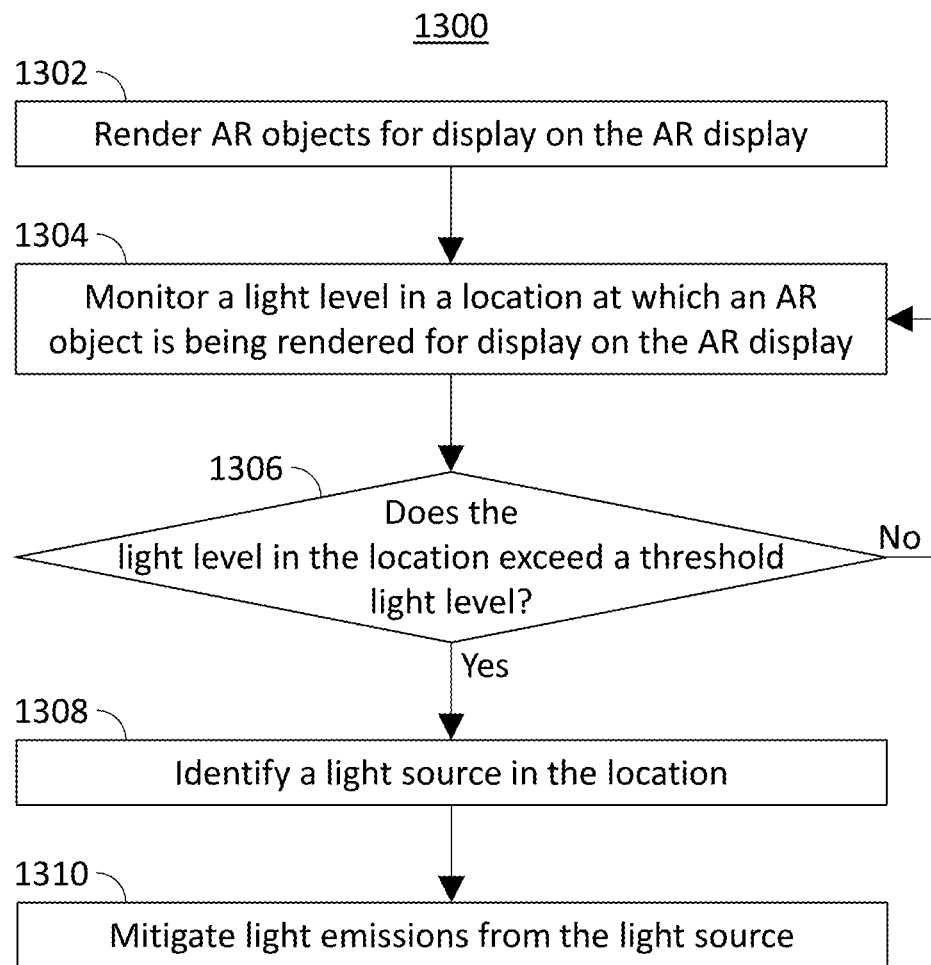
FIG. 13 is a flowchart representing an illustrative process for mitigating light emissions from a light source, in accordance with some embodiments of the disclosure.

FIG. 13 is a flowchart representing an illustrative process 1300 for mitigating light emissions from a light source, in accordance with some embodiments of the disclosure. Process 1300 may be implemented on control circuitry 408. In addition, one or more actions of process 1300 may be incorporated into or combined with one or more actions of any other process or embodiment described herein.

At 1302, control circuitry 408 renders AR objects for display on the AR display. At 1304, control circuitry monitors a light level in a location at which an AR object is being rendered for display on the AR display. For example, control circuitry 408 uses light sensors and/or cameras to measure light levels at one or more positions. At 1306, control circuitry 408 determines whether the light level in the location exceeds a threshold light level. This may be accomplished using methods described above in connection with FIG. 5. If the light level does not exceed the threshold light level ("No" at 1306), then processing returns to 1304, where control circuitry 408 continues to monitor the light level at the location.

If the light level at the location does exceed the threshold light level ("Yes" at 1306), then, at 1308, control circuitry 408 identifies a light source in the location. For example, control circuitry 408 may use image processing and direction of light reaching the light sensor or camera (sometimes in combination with motion sensors of the AR display device) to identify a light source. Alternatively or additionally, control circuitry 408 may identify a smart light source positioned in the location. At 1310, control circuitry 408 mitigates light emissions from the light source. This may be accomplished using methods described below in connection with FIG. 14.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
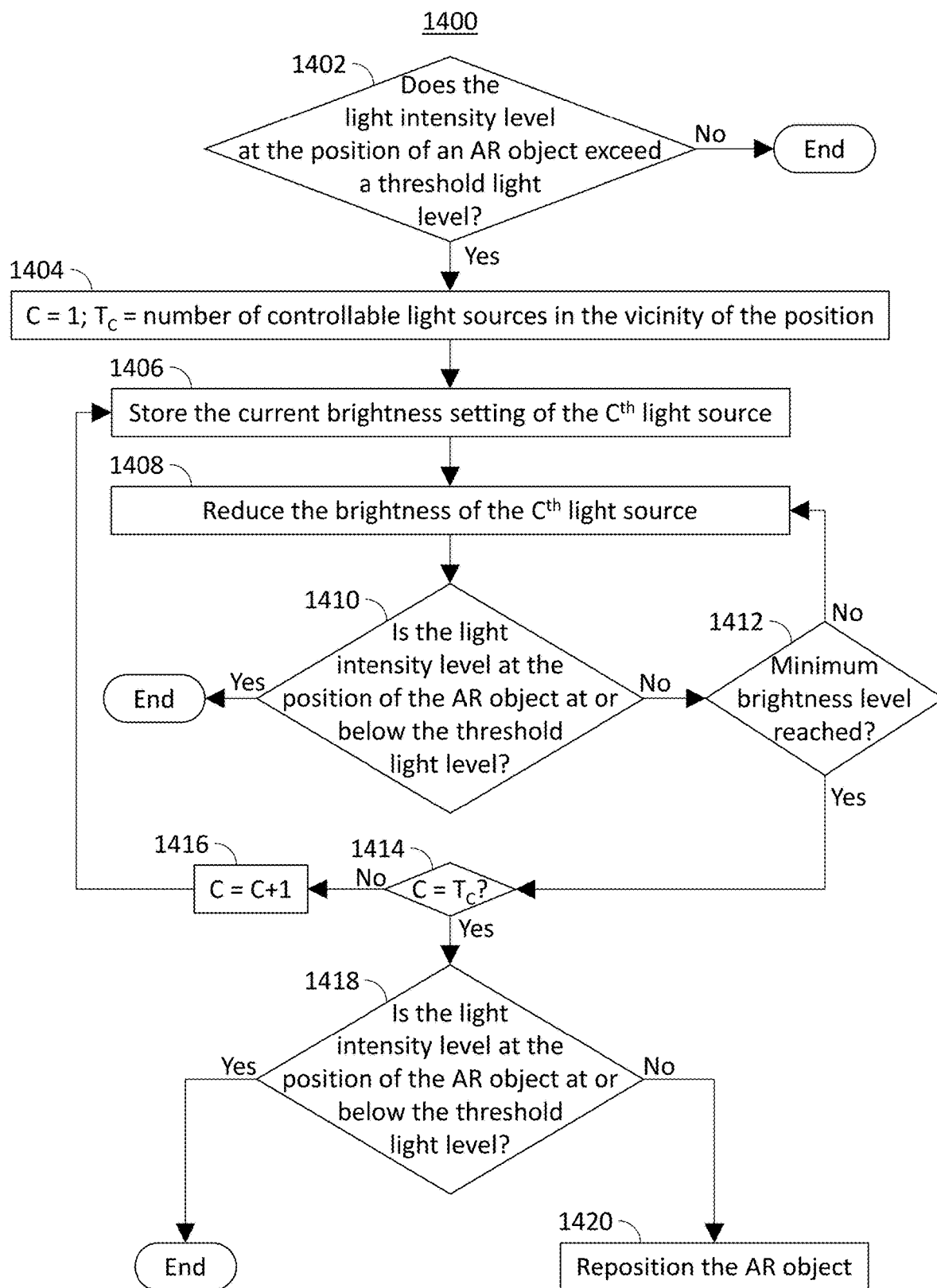
FIG. 14 is a flowchart representing an illustrative process for reducing brightness of smart lighting sources, in accordance with some embodiments of the disclosure.

FIG. 14 is a flowchart representing an illustrative process 1400 for reducing brightness of smart lighting sources, in accordance with some embodiments of the disclosure. Process 1400 may be implemented on control circuitry 408. In addition, one or more actions of process 1400 may be incorporated into or combined with one or more actions of any other process or embodiment described herein.

At 1402, control circuitry 408 determines whether the light intensity level at the position of an AR object exceeds a threshold light level. This may be accomplished using methods described above in connection with FIG. 5. At 1404, control circuitry 408 initializes a counter variable C, setting its value to one, and a variable $T_C$ representing the number of controllable light sources in the vicinity of the position. Control circuitry 408 may query a list or database of controllable light sources for positional information describing their locations.

At 1406, control circuitry 408 stores the current brightness setting of the $C^{th}$ light source. For example, control circuitry 408 may retrieve, from the light source itself or a controller thereof, a current output level. Alternatively, control circuitry 408 may compare a current brightness of the $C^{th}$ light source with stored brightness levels, each stored in associated with an output level, for the $C^{th}$ light source to identify the current output level.

At 1408, control circuitry 408 reduces the brightness of the $C^{th}$ light source. Control circuitry 408 may send instructions directly to the light source or may send instructions to a controller of the light source to reduce the output level of the light source. At 1410, control circuitry 408 determined whether the light intensity level at the position of the AR object is at or below the threshold light level. This may be accomplished using methods described above in connection with FIG. 5. If the light intensity level at the position of the AR object is now at or below the threshold light level ("Yes" at 1410), then the process ends.

If the light intensity level at the position of the AR object still exceeds the threshold light level ("No" at 1410), then, at 1412, control circuitry 408 determines whether a minimum brightness level of the $C^{th}$ light source has been reached. For example, control circuitry 408 may compare the output level of the $C^{th}$ light source with the lowest available output level of the $C^{th}$ light source. If the minimum brightness level has not been reached ("No" at 1412), then processing returns to 1408. If the minimum brightness level has been reached ("Yes" at 1412), then, at 1414, control circuitry determines whether C is equal to $T_C$, meaning that all controllable light sources in the vicinity of the position have been controlled to reduce the light intensity level at the position of the AR object. If C is not equal to $T_C$ ("No" at 1414), then, at 1416, control circuitry 408 increments the value of C by one, and processing returns to 1406.

If C is equal to $T_C$ ("Yes" at 1414), then, at 1418, control circuitry 408 determines whether the light intensity level at the position of the AR object is below the threshold light level, just as at 1410. If so ("Yes" at 1418), then the process ends. If not ("No" at 1418), then, at 1420, control circuitry 408 repositions the AR object to another location. This may be accomplished using methods described above in connection with FIGS. 6-8.

The actions or descriptions of FIG. 14 may be used with any other embodiment of this disclosure. In addition, the actions and descriptions described in relation to FIG. 14 may be done in suitable alternative orders or in parallel to further the purposes of this disclosure.

Figure 15:
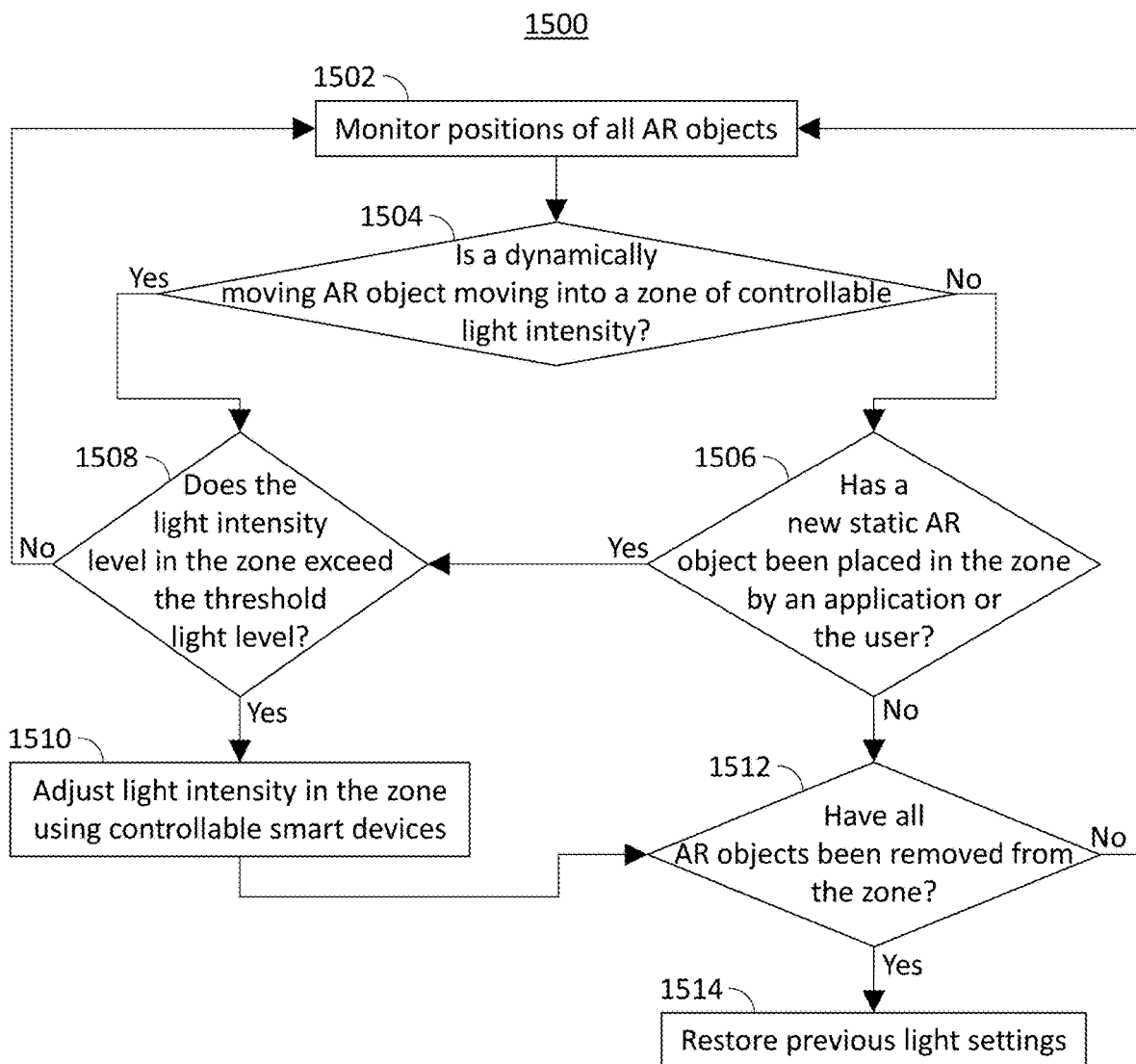
FIG. 15 is a flowchart representing an illustrative process for monitoring AR objects and adjusting or restoring lighting conditions as AR objects move throughout the area, in accordance with some embodiments of the disclosure.

FIG. 15 is a flowchart representing an illustrative process 1500 for monitoring AR objects and adjusting or restoring lighting conditions as AR objects move throughout the area, in accordance with some embodiments of the disclosure. Process 1500 may be implemented on control circuitry 408. In addition, one or more actions of process 1500 may be incorporated into or combined with one or more actions of any other process or embodiment described herein.

At 1502, control circuitry 408 monitors positions of all AR objects. This may be accomplished using methods described above in connection with FIG. 10. At 1504, control circuitry 408 determines whether a dynamically moving AR object is moving into a zone of controllable light intensity. For example, when identifying light sources and/or calibrating smart light sources, control circuitry 408 may identify and save zones where light from each light source reaches. Control circuitry 408 may use the current position and trajectory of a dynamically moving AR object to predict whether the AR object will enter the identified zone. If not ("No" at 1504), then, at 1506, control circuitry 408 determines whether a new static AR object has been placed in the identified zone by an application or by the user. For example, control circuitry 408 may compare the coordinates of newly placed static AR objects with boundary coordinates of the identified zone.

If a new static AR object has been placed in the zone ("Yes" At 1506), or if a dynamically moving object is moving into the zone ("Yes" at 1504), then, at 1508, control circuitry 408 determines whether the light intensity level in the identified zone exceeds the threshold light level. This may be accomplished using methods described above in connection with FIG. 5. If the light intensity in the zone exceeds the threshold ("Yes" at 1508), then, at 1510, control circuitry 408 adjusts the light intensity in the zone using controllable smart devices. This may be accomplished using methods described above in connection with FIG. 14.

If no new static AR objects have been placed in the zone ("No" at 1506), or after adjusting the light intensity in the zone in response to a dynamically moving AR object entering the zone (at 1510), at 1512, control circuitry 408 determines whether all AR objects have been removed from the zone. For example, static AR object may be manually repositioned or removed from display by the user or may be removed from the display at the conclusion of the content being displayed therein. Dynamically moving AR objects may continue on their trajectories and may leave the zone through such movements. Control circuitry 408 may compare the positions of each AR object with the boundary of the zone to determine whether any AR object remains within the zone. If AR objects remain in the zone ("No" at 1512), then processing returns to 1502 where control circuitry 408 continues to monitor positions of all AR objects. If all AR objects have been removed from the zone ("Yes" at 1512), then, at 1514, control circuitry 408 restores previous light settings in the zone. This may be accomplished using methods described above in connection with FIG. 12.

The actions or descriptions of FIG. 15 may be used with any other embodiment of this disclosure. In addition, the actions and descriptions described in relation to FIG. 15 may be done in suitable alternative orders or in parallel to further the purposes of this disclosure.

Figure 16:
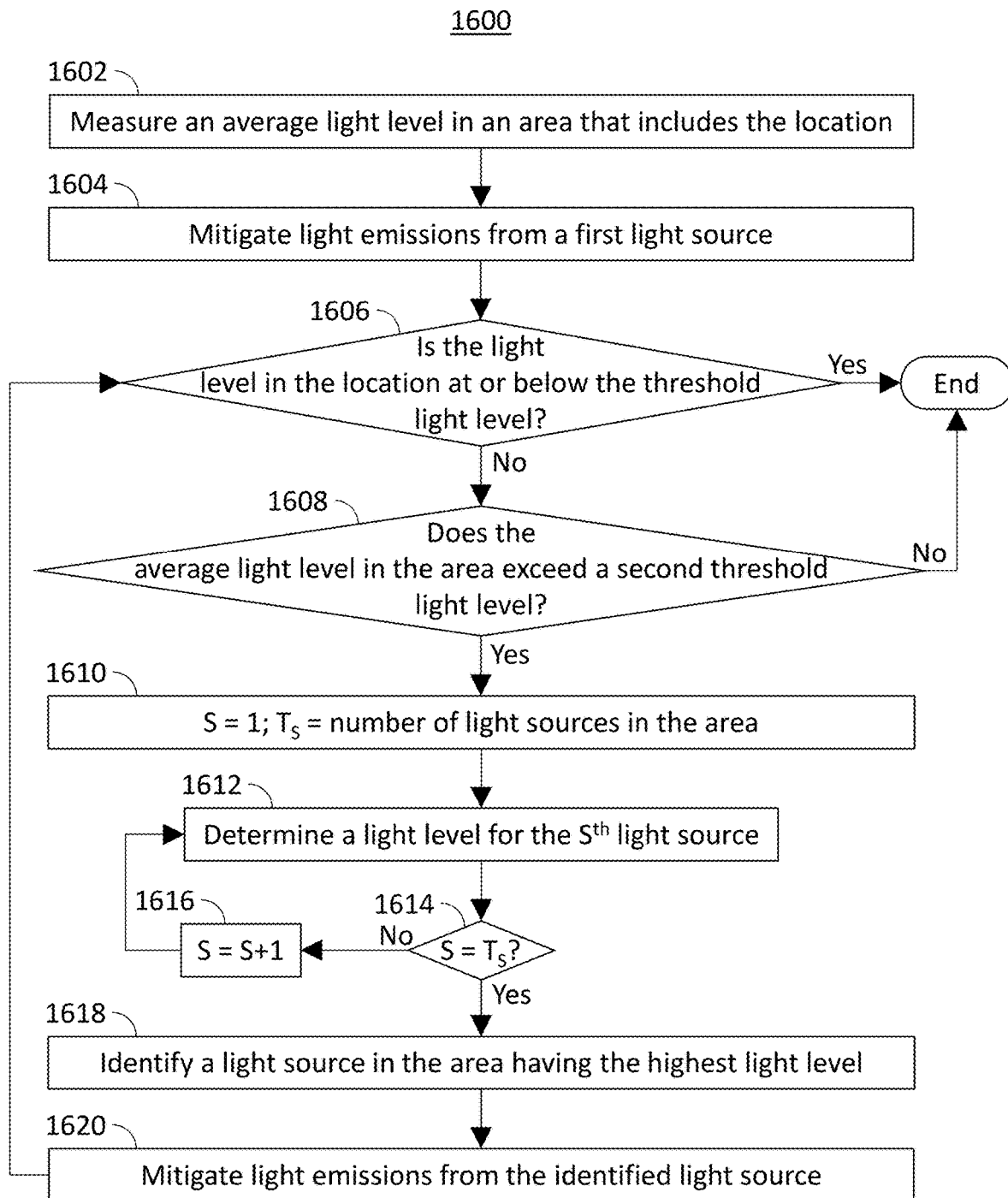
FIG. 16 is a flowchart representing an illustrative process for reducing brightness of additional light sources, in accordance with some embodiments of the disclosure.

FIG. 16 is a flowchart representing an illustrative process 1600 for reducing brightness of additional light sources, in accordance with some embodiments of the disclosure. Process 1600 may be implemented on control circuitry 408. In addition, one or more actions of process 1600 may be incorporated into or combined with one or more actions of any other process or embodiment described herein.

At 1602, control circuitry 408 measures an average light level in an area that includes the location. For example, control circuitry 408 may measure light intensity levels at a plurality of positions surrounding the location and calculate an average intensity level. At 1604, control circuitry 408 mitigates light emissions from a first light source. This may be accomplished using methods described above in connection with FIG. 14. At 1606, control circuitry 408 determines whether the light level in the location is at or below the threshold light level. This may be accomplished using methods described above in connection with FIG. 5. If the light level at the location is at or below the threshold light level ("Yes" at 1606), then, the process ends. If not ("No" at 1606), then, at 1608, control circuitry 408 determines whether the average light level in the area exceeds a second threshold light level. This may be accomplished using methods described above in connection with FIG. 5. If the average light level in the area does not exceed the second threshold light level ("No" at 1608), then the process ends.

If the average light level in the area does exceed the second threshold light level ("Yes" at 1608), then, at 1610, control circuitry 408 initializes a counter variable S, setting its value to one, and a variable $T_S$ representing the number of light sources in the area. At 1612, control circuitry 408 determines a light level for the $S^{th}$ light source. This may be accomplished using methods described above in connection with FIG. 14. At 1614, control circuitry 408 determines whether S is equal to $T_S$, meaning that the light level for each light source in the area has been determined. If S is not equal to $T_S$ ("No" at 1614), then, at 1616, control circuitry 408 increments the value of S by one, and processing returns to 1612.

If S is equal to $T_S$ ("Yes" at 1614), then, at 1618, control circuitry 408 identifies a light source in the area having the highest light level. For example, control circuitry 408 may sort a list of light sources by their detected light levels in decreasing order. At 1620, control circuitry 408 mitigates light emissions from the identified light source having the highest light level. Processing then returns to 1606, where control circuitry 408 again determines whether the light level in the location is at or below the threshold light level. If the light level is still above the threshold light level, control circuitry 408 may repeat this process until the light level in the location is at or below the threshold light level.

The actions or descriptions of FIG. 16 may be used with any other embodiment of this disclosure. In addition, the actions and descriptions described in relation to FIG. 16 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for compensating for excessive light levels when using an augmented reality (AR) display, the method comprising:
   rendering AR objects for display on the AR display;
   monitoring a light level in a location at which an AR object is being rendered for display on the AR display;
   determining whether the light level in the location exceeds a threshold light level; and
   in response to determining that the light level in the location exceeds the threshold light level:
      identifying a light source in the location; and
      mitigating light emissions from the light source.

2. The method of claim 1, wherein identifying a light source in the location further comprises:
   measuring light levels at a plurality of positions within the location;
   comparing, for each respective position of the plurality of positions, the light level measured at the respective position with the threshold light level; and
   determining, based on the comparing, that the light level measured at a first position exceeds the threshold light level.

3. The method of claim 2, further comprising storing an indication of a light source in association with an identifier of the first position.

4. The method of claim 1, further comprising identifying a type of the light source.

5. The method of claim 4, wherein the type of light source is a light fixture, and wherein mitigating light emissions from the light source further comprises:
   accessing a controller of the light fixture; and
   decreasing light output from the light fixture using the controller.

6. The method of claim 4, wherein the type of light source is a window, and wherein mitigating light emissions from the light source further comprises:
   accessing a controller of a shade associated with the window; and
   covering the window with the shade using the controller.

7. The method of claim 1, further comprising:
   generating a spatial map of an area that includes the location;
   measuring respective light levels at a plurality of positions within the area; and
   storing the respective light levels in the spatial map in association with respective corresponding positions of the plurality of positions.

8. The method of claim 7, further comprising:
   periodically remeasuring light levels at the plurality of positions corresponding to the stored light levels; and
   updating the spatial map to include current levels at each position of the plurality of positions.

9. The method of claim 1, further comprising:
   measuring an average light level in an area that includes the location;
   determining, after mitigating light emissions from the light source, whether the light level in the location is at or below the threshold light level; and
   in response to determining that the light level at the location still exceeds the threshold light level:
      determining whether the average light level in the area exceeds a second threshold light level; and
      in response to determining that the average light level in the area exceeds the second threshold light level, mitigating light emissions from a second light source.

10. The method of claim 9, wherein mitigating light emissions from a second light source further comprises:
    identifying a plurality of light sources within the area;
    determining a respective light level of each light source of the plurality of light sources;
    identifying, as the second light source, a light source having a highest respective light level; and
    decreasing light output from the second light source.

11. A system for compensating for excessive light levels when using an augmented reality (AR) display, the system comprising:
    light detection circuitry; and
    control circuitry configured to:
       render AR objects for display on the AR display;
       monitor, using the light detection circuitry, a light level in a location at which an AR object is being rendered for display on the AR display;
       determine whether the light level in the location exceeds a threshold light level; and
       in response to determining that the light level in the location exceeds the threshold light level:
          identify a light source in the location; and
          mitigate light emissions from the light source.

12. The system of claim 11, wherein the control circuitry configured to identify a light source in the location is further configured to:

measure light levels at a plurality of positions within the location;

compare, for each respective position of the plurality of positions, the light level measured at the respective position with the threshold light level; and determine, based on the comparing, that the light level measured at a first position exceeds the threshold light level.

13. The system of claim 12, wherein the control circuitry is further configured to store an indication of a light source in association with an identifier of the first position.

14. The system of claim 11, wherein the control circuitry is further configured to identify a type of the light source.

15. The system of claim 14, wherein the type of light source is a light fixture, and wherein the control circuitry configured to mitigate light emissions from the light source is further configured to:

access a controller of the light fixture; and decrease light output from the light fixture using the controller.

16. The system of claim 14, wherein the type of light source is a window, and wherein the control circuitry configured to mitigate light emissions from the light source is further configured to:

access a controller of a shade associated with the window; and cover the window with the shade using the controller.

17. The system of claim 11, wherein the control circuitry is further configured to:

generate a spatial map of an area that includes the location;

measure respective light levels at a plurality of positions within the area; and store the respective light levels in the spatial map in association with respective corresponding positions of the plurality of positions.

18. The system of claim 17, wherein the control circuitry is further configured to:

periodically remeasure light levels at the plurality of positions corresponding to the stored light levels; and update the spatial map to include current levels at each position of the plurality of positions.

19. The system of claim 11, wherein the control circuitry is further configured to:

measure an average light level in an area that includes the location;

determine, after mitigating light emissions from the light source, whether the light level in the location is at or below the threshold light level; and in response to determining that the light level at the location still exceeds the threshold light level:

determine whether the average light level in the area exceeds a second threshold light level; and in response to determining that the average light level in the area exceeds the second threshold light level, mitigate light emissions from a second light source.

20. The system of claim 19, wherein the control circuitry configured to mitigate light emissions from a second light source is further configured to:

identify a plurality of light sources within the area;

determine a respective light level of each light source of the plurality of light sources;

identify, as the second light source, a light source having a highest respective light level; and decrease light output from the second light source.

* * * * *